United States Patent
Napadensky

(10) Patent No.: US 9,031,680 B2
(45) Date of Patent: May 12, 2015

(54) SOLID FREEFORM FABRICATION USING A PLURALITY OF MODELING MATERIALS

(71) Applicant: Objet Ltd., Rechovot (IL)

(72) Inventor: Eduardo Napadensky, Natania (IL)

(73) Assignee: Stratasys Ltd., Rehovet (IL)

( * ) Notice: Subject to any disclaimer, the term of this patent is extended or adjusted under 35 U.S.C. 154(b) by 0 days.

(21) Appl. No.: 13/677,376

(22) Filed: Nov. 15, 2012

(65) Prior Publication Data

US 2013/0073068 A1    Mar. 21, 2013

Related U.S. Application Data

(63) Continuation of application No. 12/692,695, filed as application No. PCT/IL2008/001025 on Jul. 24, 2008, now abandoned.

(60) Provisional application No. 60/935,090, filed on Jul. 25, 2007.

(51) Int. Cl.
*G06T 17/00* (2006.01)
*B29C 67/00* (2006.01)

(52) U.S. Cl.
CPC .............. *G06T 17/00* (2013.01); *B29C 67/0059* (2013.01); *B29C 67/0092* (2013.01)

(58) Field of Classification Search
CPC ............ B29C 67/0055; B29C 67/0059; B29C 67/0092; G06T 17/00; G06T 19/00; G06T 2219/2016; G05B 19/4097; G05B 19/4099; G05B 2219/35066; G05B 2219/49013; G03F 7/0037

USPC ............ 700/95–98, 106, 117–124, 159, 163; 706/903, 904, 919; 703/1; 264/401
See application file for complete search history.

(56) References Cited

U.S. PATENT DOCUMENTS

| | | | |
|---|---|---|---|
| 5,398,193 A | 3/1995 | DeAngelis | |
| 5,402,351 A * | 3/1995 | Batchelder et al. | 700/119 |
| 5,586,039 A | 12/1996 | Hirsch et al. | |
| 6,112,133 A | 8/2000 | Fishman | |
| 6,220,743 B1 | 4/2001 | Campestre et al. | |
| 6,405,095 B1 | 6/2002 | Jang et al. | |
| 6,580,959 B1 | 6/2003 | Mazumder | |
| 6,630,093 B1 * | 10/2003 | Jones | 264/401 |
| 6,780,368 B2 * | 8/2004 | Liu et al. | 264/401 |

(Continued)

FOREIGN PATENT DOCUMENTS

| | | |
|---|---|---|
| JP | 2004-090530 | 3/2004 |
| WO | WO 2004/096527 | 11/2004 |
| WO | WO 2009/013751 | 1/2009 |

OTHER PUBLICATIONS

Communication Pursuant to Article 94(3) EPC Dated Jul. 6, 2011 From the European Patent Office Re. Application No. 08776652.3.

(Continued)

*Primary Examiner* — M.N. Von Buhr

(57) ABSTRACT

A system and methods for solid freeform fabrication of an object is disclosed. The system comprises a solid freeform fabrication apparatus having a plurality of dispensing heads, a building material supply apparatus configured to supply a plurality of building materials to the fabrication apparatus, and a control unit configured for controlling the fabrication apparatus and the supply apparatus based on an operation mode selected from a plurality of predetermined operation modes.

27 Claims, 14 Drawing Sheets

(56) References Cited

U.S. PATENT DOCUMENTS

| | | | |
|---|---|---|---|
| 6,813,594 B2* | 11/2004 | Guertin et al. | 703/6 |
| 6,846,179 B2* | 1/2005 | Chapouland et al. | 433/24 |
| 6,882,895 B1* | 4/2005 | Knoppers et al. | 700/119 |
| 6,898,477 B2 | 5/2005 | Loughran | |
| 7,149,595 B2 | 12/2006 | D'Mura | |
| 7,225,045 B2 | 5/2007 | Gothait et al. | |
| 7,280,990 B2 | 10/2007 | Turner et al. | |
| 7,300,619 B2 | 11/2007 | Napadensky et al. | |
| 7,369,915 B2* | 5/2008 | Kritchman et al. | 700/118 |
| 7,371,073 B2* | 5/2008 | Williams | 439/66 |
| 7,509,240 B2* | 3/2009 | Das et al. | 703/1 |
| 7,542,817 B2* | 6/2009 | St. Ville | 700/98 |
| 7,628,617 B2* | 12/2009 | Brown et al. | 439/66 |
| 7,688,318 B2 | 3/2010 | O'Malley, III et al. | |
| 7,758,351 B2* | 7/2010 | Brown et al. | 439/66 |
| 7,890,303 B2 | 2/2011 | Matsuda | |
| 8,584,353 B2* | 11/2013 | Williams | 29/852 |
| 2004/0187714 A1 | 9/2004 | Napadensly et al. | |
| 2005/0012247 A1* | 1/2005 | Kramer et al. | 264/401 |
| 2005/0017414 A1* | 1/2005 | Gurovich | 264/488 |
| 2005/0071135 A1 | 3/2005 | Vredenburgh et al. | |

OTHER PUBLICATIONS

Communication Relating to the Results of the Partial International Search Dated Nov. 9, 2009 From the International Searching Authority Re.: Application No. PCT/IL2008/001025.

International Preliminary Report on Patentability Dated Mar. 11, 2010 From the International Searching Authority Re.: Application No. PCT/IL2008/001025.

International Search Report and the Written Opinion Dated Feb. 26, 2010 From the International Searching Authority Re.: Application No. PCT/IL2008/001025.

Official Action Dated May 17, 2012 From the US Patent and Trademark Office Re. U.S. Appl. No. 12/692,695.

Response Dated Jan. 5, 2012 to Communication Pursuant to Article 94(3) EPC of Jul. 6, 2011 From the European Patent Office Re. Application No. 08776652.3.

Communication Pursuant to Article 94(3) EPC Dated Oct. 22, 2013 From the European Patent Office Re. Application No. 08776652.3.

European Search Report and the European Search Opinion Dated Oct. 22, 2013 From the European Patent Office Re. Application No. 13176069.6.

European Search Report and the European Search Opinion Dated Oct. 22, 2013 From the European Patent Office Re. Application No. 13176072.0.

Communication Pursuant to Rules 70(2) and 70a(2) EPC and Reference to Rule 39(1) EPC Dated Nov. 25, 2013 From the European Patent Office Re. Application No. 13176069.6.

Communication Pursuant to Rules 70(2) and 70a(2) EPC and Reference to Rule 39(1) EPC Dated Nov. 25, 2013 From the European Patent Office Re. Application No. 13176072.0.

\* cited by examiner

Fig. 3a
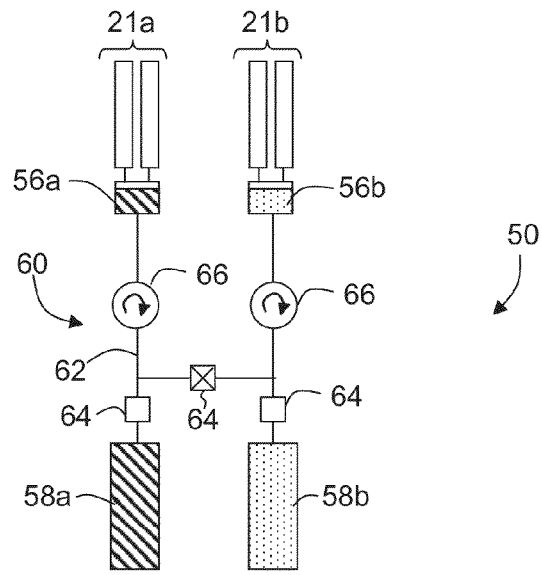
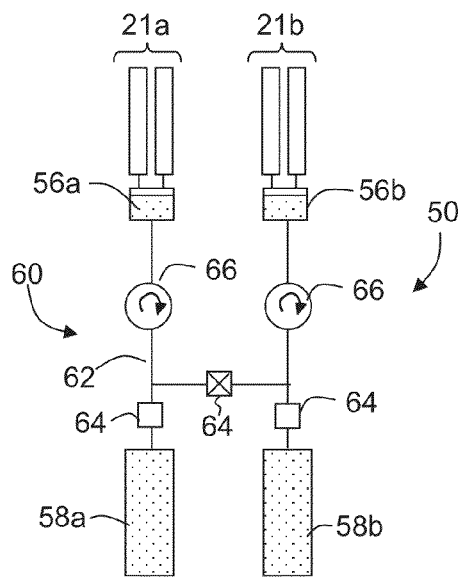
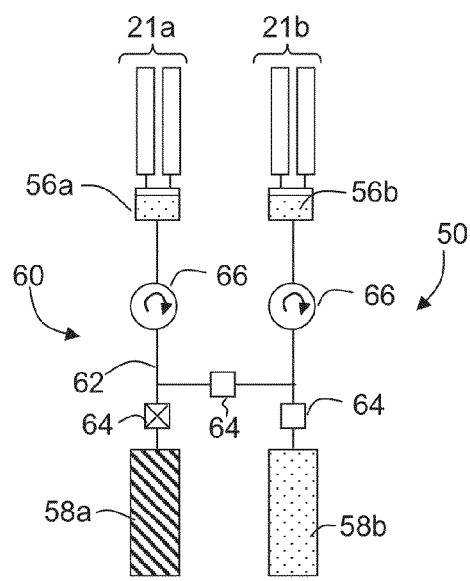
Fig. 3b
Fig. 3c

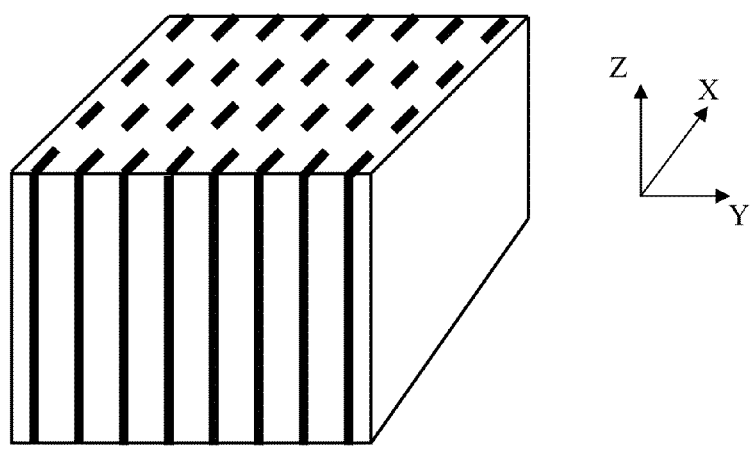
Fig. 11
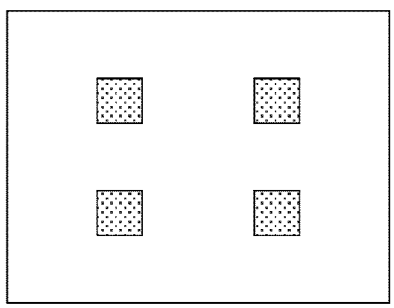 
Fig. 12a              Fig. 12b

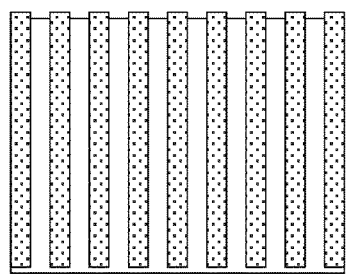
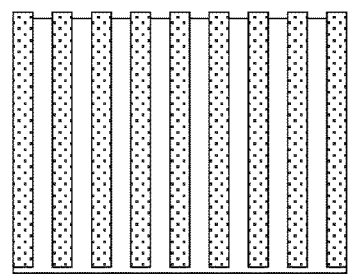
Fig. 13a                    Fig. 13b
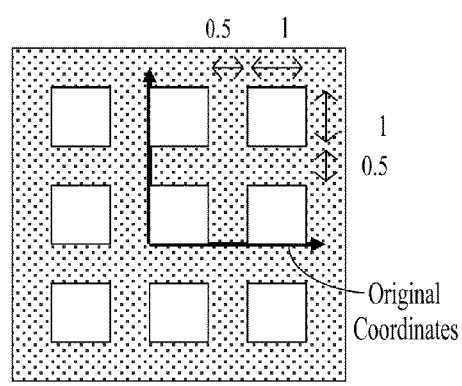
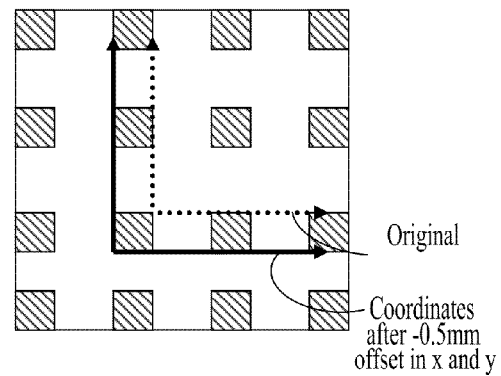
Fig. 14a                    Fig. 14b

SOLID FREEFORM FABRICATION USING A PLURALITY OF MODELING MATERIALS

RELATED APPLICATIONS

This application is a continuation of U.S. patent application Ser. No. 12/692,695 to filed on Jan. 25, 2010, which is a continuation of PCT Patent Application No. PCT/IL2008/001025 having International Filing Date of Jul. 24, 2008, which claims the benefit of priority of U.S. Provisional Patent Application No. 60/935,090 filed on Jul. 25, 2007. The contents of the above applications are all incorporated herein by reference.

FIELD AND BACKGROUND OF THE INVENTION

The present invention relates to solid freeform fabrication and, more particularly, to a solid freeform fabrication using a plurality of modeling materials.

Solid Freeform Fabrication (SFF) is a technology enabling fabrication of arbitrarily shaped structures directly from computer data via additive formation steps. The basic operation of any SFF system consists of slicing a three-dimensional computer model into thin cross sections, translating the result into two-dimensional position data and feeding the data to control equipment which fabricates a three-dimensional structure in a layerwise manner.

Solid freeform fabrication entails many different approaches to the method of fabrication, including three-dimensional printing, electron beam melting, stereolithography, selective laser sintering, laminated object manufacturing, fused deposition modeling and others.

In three-dimensional printing processes, for example, a building material is dispensed from a dispensing head having a set of nozzles to deposit layers on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 6,863,859, 7,183,335 7,209,797, 7,300,619 and 7,225,045 and U.S. Published Applications Nos. 20050104241 and 20060054039, all of the same Assignee, the contents of which are hereby incorporated by reference.

Solid freeform fabrication is typically used in design-related fields where it is used for visualization, demonstration and mechanical prototyping. Thus, SFF facilitates rapid fabrication of functioning prototypes with minimal investment in tooling and labor. Such rapid prototyping shortens the product development cycle and improves the design process by providing rapid and effective feedback to the designer. SFF can also be used for rapid fabrication of non-functional parts, e.g., for the purpose of assessing various aspects of a design such as aesthetics, fit, assembly and the like. Additionally, SFF techniques have been proven to be useful in the fields of medicine, where expected outcomes are modeled prior to performing procedures. It is recognized that many other areas can benefit from rapid prototyping technology, including, without limitation, the fields of architecture, dentistry and plastic surgery where the visualization of a particular design and/or function is useful.

Although numerous improvements and different approaches which have been developed over the years for solid freeform fabrication, the number of techniques which allow the additive formation of objects using more than one modeling material is limited.

U.S. Pat. No. 5,149,548 of Yamane et al., for example, discloses a three-dimensional printing technique using two-part curable material. The material is jetted from an ink jet head to a stage and laminated thereon. The ink jet head is disposed under the stage, such that the two-part curable material is jetted from a downward side to an upward side and is cured every jetting process. The apparatus may include several inkjet nozzles and the two-part curable material can be exchanged for another during the process. Since the jetting is from a downward side to an upward side, a newly-exchanged two-part curable material is not mixed or combined with the previously-used two-part curable material.

U.S. Pat. No. 6,508,971 of Leyden et al., discloses a technique for creating a three-dimensional object by depositing a build material on a working surface from a plurality of dispensing orifices in a print head. The build material is selectively dispensed from the print head while scanning the working surface. Subsequently, the print head is repositioned and the scan is repeated along a path which is offset from the previous path. The scans are repeated until the three-dimensional object is formed. The disclosure contemplates the use of different materials on different raster lines or drop locations.

U.S. Pat. No. 6,658,314 of Gothait et al. and incorporated herein by reference, to discloses a printing system and a method for printing complex three-dimensional models utilizing two dispensing heads which eject building material. A "modeling" material is dispensed from a dispensing head, and a "support" material is dispensed from a second dispensing head. The two materials may be combined to produce layers for forming the three-dimensional model, while a different combination is used to build the support structure or the release structure.

The two building materials may have different hardness characteristics so as to control the hardness of the layers. The construction layers of the model are formed with a harder modulus of elasticity than the release layers.

U.S. Pat. No. 7,300,619, of the present Assignee, the contents of which are hereby incorporated by reference, discloses apparatus for management and control of the supply of building materials to three-dimensional printing systems. A supply system having a set of valves or a valve matrix is used for controlling the supply. Management and control of materials are achieved by measuring data on the status of building material in the printing cartridge or the supply system, and processing the building material status data to determine parameters of the building material. The supply system can include several cartridges each containing one type of building material, either modeling material or support material. Different cartridges can contain different types of materials and colors.

U.S. Published Application No. 20040187714 of the same Assignee specifies use of modeling materials having different properties, in different combinations, in order to obtain different regions, forming a homogeneous or non-homogeneous three-dimensional structure in which different regions may be structurally different, chemically different or have different properties. The different combinations comprise composite materials having properties that vary within the material.

U.S. Published Application No. 20060159869 of Kramer et al., discloses a solid freeform fabrication technique in which two reactive build compositions which include the same material property but with different attributes (typically, one composition is mechanically flexible while the other is mechanically rigid), are dispensed onto a substrate to form a mixed composition. The mixed composition is subsequently cured to form a layer of cured composition, which includes the same material property but with an attribute which differs from, and depends upon the respective amounts of each of the individual attributes of the dispensed compositions. The disclosure also contemplates the solid freeform fabrication of three-dimensional objects having regions which vary in the material property.

U.S. Pat. No. 7,500,846 of the present Assignee, the contents of which are hereby incorporated by reference, teaches the use of one or more types of photopolymers dispensed separately or together, simultaneously or consecutively.

U.S. Pat. No. 6,989,115 (Russell et al.) discloses a three-dimensional printer including multiple printheads for printing binder and/or colorant onto a bed of build material in a build chamber. The printer can include determining the total amount of binder liquid needed to solidify the build material at the particular location, determining the amount of each of the colored binder liquids needed to produce the desired color at the particular location and determining the amount of colorless binder liquid that needs to be added to the colored binder liquids to obtain the predetermined total binder liquid requirement.

SUMMARY OF THE INVENTION

It was found by the inventors of the present invention that the throughput associated with traditional techniques in which more than one modeling material is used for the fabrication of an object is considerably lower compared to single modeling material techniques. The present inventors also found that the number of building materials that can be used or produced in conventional techniques is very limited, and the properties of the materials that can be obtained are still far inferior compared to the properties of standard engineering polymers.

The present invention provides system and methods suitable for solid freeform fabrication. The system comprises solid freeform fabrication apparatus having a plurality of dispensing heads. The system preferably has two or more modes of operation, in which in a first operation mode all the dispensing heads of the system are operational throughout a building scan cycle in each location of the layer, and in a second operation mode at least one dispensing head of the system is not operative during at least a part of the building scan cycle of the layer.

In various exemplary embodiments of the invention, the first operation mode is used for fabricating objects made of a single material, e.g., a single modeling material, to and the second operation mode is used for fabricating objects made of two or more materials, e.g. two or more modeling materials.

In some embodiments of the invention, the first operation mode is used for fabricating objects using a combination of equal amounts of more than one modeling material, wherein the combination is produced by dispensing the different materials from different dispensing heads, to form a single uniform material after deposition.

In some embodiments, the second operation mode is used for fabricating objects using two or more modeling materials in different predetermined combinations, wherein the combinations are produced by dispensing the different modeling materials from different dispensing heads.

In some embodiments, the second operation mode is used for the simultaneous building of more than one object, each object being fabricated using a different modeling material or a different modeling material combination, wherein the combination is produced by dispensing different materials from different dispensing heads.

In some embodiments, the second operation mode is used for the simultaneous building of different areas or regions of a single object, each area or region being fabricated using a different modeling material or a different modeling material combination.

The mode of operation can be selected automatically by the system or may be selected by the operator, according to the final model or object desired to be produced. For example, the system can automatically choose the first operation mode when the object/s or parts thereof to be fabricated are specified as built of the same single modeling material, and when this modeling material is already fed into all the modeling material dispensing heads, or when it is desired to build an object using an uniform mix of the modeling materials already fed into the modeling material dispensing heads.

In the first operation mode, an object formed of a single modeling material may be fabricated for example by dispensing a single modeling material via all of the dispensing heads. Alternatively, in the first operation mode, an object made of a mix of modeling materials can be fabricated in first operation mode using two or more modeling materials, where, for example, two different modeling materials are dispensed from different dispensing heads, simultaneously and in equal amounts throughout the to object, to form a uniform mix of materials.

In some embodiments of the invention an object is fabricated by dispensing two or more materials, each from a different dispensing head, where one or both of the materials may have a valuable property, but not have the properties required to function as a modeling material on its/their own. In these embodiments the combination of the two materials provides the properties required to build the desired object. One example is dispensing liquid resin from a first head and dispensing liquid hardener from a second head, where the combination of both leads to a solid material.

In another embodiment, one of the materials may be non-solidifiable, while the other material is solidifiable. The first material is non-solidifiable in that it does not solidify during the fabrication process, but remains in liquid, gel, paste or other non-solid or semi-solid form. The second material is solidifiable in that it can be solidified by an appropriate solidification procedure. The solidifiable material can fully surround or contain the non-solidifiable material. The non-solidifiable material can remain within the object, or alternatively be drained, burnt out or otherwise removed once the process is complete. In this way, for example, a hollow or porous model can be provided.

In some embodiments, two materials are non-solidifiable but their combination is solidifiable.

In some embodiments, at least one of the modeling materials has a required property other than a building property. For example, the surrounded ("contained") material may be a material which has a valuable property, e.g., biological, pharmaceutical, or other activity, and the "containing" structure and material type allow the release of the contained material over time, e.g. controlled release or sustained release or slow release of the material, in order to enable it, for example, to express its biological or pharmaceutical activity, according to its intended use. All these alternatives can be carried out in the second operation mode of the present embodiments.

The second operation mode provides various options to operate the system. In one embodiment, the system fabricates objects which have different parts consisting of different materials, e.g., two separate parts of a specific object, each part consisting of a different modeling material. In another embodiment, an object may have two parts, each of which may consist of a different combination of more than one modeling material. In an additional embodiment, a number of different objects are to simultaneously fabricated on a single working surface or tray, where some objects on the tray are made of a single modeling material while others are made of another single material or different combinations of more than one modeling material.

Preferred embodiments of the invention provide the possibility to fabricate an object made of a composite material, which is comprised of two or more individual modeling materials having different properties. The individual modeling materials are selected for use on the basis of their properties so as to obtain a material with a third, different property or a combination of their properties. The composite material can, for example, have a property or properties different to those of each of the two or more individual modeling materials used, depending on the relative amounts of each individual modeling material dispensed and the order or "structure" of their deposition.

The ability of the system of the present embodiments to utilize two or more different modeling materials, makes it is possible to use and/or produce many more, and more varied materials in solid freeform fabrication than has been possible to date in conventional solid freeform fabrication techniques, as well as providing many different possibilities for combining multiple materials, according to the final object and/or object properties desired to be obtained.

The ability of the system of the present embodiments to utilize two or more different modeling materials, allows the fabrication of parts or objects having properties which are difficult, if not impossible, to achieve using conventional solid freeform fabrication techniques. For example, modeling materials which have a great tendency to shrink as a result of the polymerization process are not usually suitable for use in traditional solid freeform fabrication apparatus. A modeling material suffering from high shrinkage during solidification makes especially difficult the manufacturing of bulky three dimensional geometries but may allow the fabrication of thin shell like three dimensional geometries, for example, around a bulky object which is fabricated of a material with acceptable shrinkage. The system of the present embodiments usefully provides a solution to this problem. For example, the system of the present embodiments can fabricate parts or objects in which the surfaces of the part or object are made of one material, while the internal regions of the part or object comprise a different material. In this example, the internal regions may be fabricated of a material which lacks mechanical strength, such as a gel or liquid, but having other desirable properties such as being easily burnt without leaving ash or other traces.

The ability of the system of the present embodiments to utilize two or more different modeling materials, also allows the fabrication of objects via a segmentation process, wherein layers are built in segments or "tiles". Such process is described in U.S. Application No. 60/430,362 and U.S. Pat. No. 7,300,619, the contents of which are hereby incorporated by reference. The segments or tiles may be comprised of one material, and joined by dispensing a different material, e.g., a binder or glue-like material, in the breaks between the segments. By building in smaller segments or tiles instead of a full layer, this method serves to overcome problems of material shrinkage which may occur during the curing process.

According to the present embodiments, the digital representation of a three-dimensional object may be created by using suitable software such as CAD (Computer Aided Design) software, a scanning system, or an imaging system e.g., CT system or MRI system, which produces data which may be converted to a standard communication file format, e.g., STL (Standard Tessellation Language) format, legible by the solid freeform fabrication apparatus. STL files are read by the system of the present embodiments and 'sliced' into thin layers (also referred to as slices). A controller preferably converts the thin slices into physical layers of building material to be deposited, according to the digital slices, during the course of fabricating the three-dimensional object.

The STL file may include information regarding a number of separate regions. Typically, an object is communicated from CAD to an SFF machine by a single STL file. After retrieving region information from that STL (or specifying regions by other means) the object information can be saved as a bunch of STL files, each of which describes a region in the object, and all having common coordinate system and origin. The process of retrieving regions in an object from an STL file may be carried out generally as known in the art, for example, as described in U.S. Pat. No. 5,768,134, assigned to Materialise N.V.

Before fabrication, the virtual object is preferably 'sliced' by the system into thin slices, which may be described as bitmaps, and transferred to the fabrication engine for transforming into layers forming the three-dimensional object.

In a preferred embodiment of the present invention, the specific modeling to materials to be used, and their combination and/or spatial deposition within the object layer are defined in the system's software for each region, according to the pre-defined properties desired for each part of the final object. For example, in a preferred embodiment, an STL is divided by an SFF system into a number of new STL-s, each defining a sub region in the object. The new STLs are then assembled to form a group of STLs, which describe the same original object. Then, a modeling material or modeling material combination to be used in the fabrication of each new STL is assigned to each STL. The system then slices the group of STLs. The resulting slices are in-turn divided into respective slices for each of the different dispensing heads. Finally the system sends the slices to the fabrication apparatus or printer to build layers of material. In another embodiment, a set of communication files, for example, a set of STL files, each defining a region in the object and referring to a common coordinate system and origin, is prepared by the object design software, i.e. CAD software.

In an alternative embodiment, for any given region, a user or operator of the apparatus of the invention may introduce user-defined definitions, e.g., via user interface software for the apparatus of the invention. For example, a user or operator may select a specific region and define within the region, sub-areas of the region, and select modeling materials and/or modeling material combinations for the thus defined sub-areas of the region, according to the properties desired for each respective sub-area. One example of this is defining one modeling material or material combination for the boundary of the region and a different modeling material or material combination for the inside of the region.

According to an aspect of some embodiments of the present invention there is provided a system for solid freeform fabrication of an object. The system comprises: a solid freeform fabrication apparatus having a plurality of dispensing heads; a building material supply apparatus configured to supply a plurality of building materials to the fabrication apparatus; and a control unit configured for controlling the fabrication apparatus and the building material supply apparatus, based on an operation mode selected from a plurality of predetermined operation modes.

According to some embodiments of the invention the plurality of operation modes comprises at least a first operation mode in which all dispensing heads operate to during a single building scan cycle of the fabrication apparatus, and a second operation mode in which at least one dispensing head is not operative during at least a part of the single building scan cycle.

According to an aspect of some embodiments of the present invention there is provided a method of fabricating a three-dimensional object, comprising operating the system so as to form the three-dimensional object.

According to some embodiments of the present invention at least one operation mode allows the dispensing heads to dispense one type of modeling material and a support material.

According to some embodiments of the present invention at least one operation mode allows the dispensing heads to dispense at least two types of modeling materials and a support material.

According to some embodiments of the present invention at least some of the plurality of dispensing heads is included in one mechanical unit According to some embodiments of the present invention a throughput characterizing the first operation mode is larger than a throughput characterizing the second operation mode.

According to some embodiments of the present invention a throughput characterizing the first operation mode is at least two times larger than a throughput characterizing the second operation mode.

According to some embodiments of the present invention the plurality of dispensing heads has generally similar characteristic dispensing rates.

According to some embodiments of the present invention the plurality of dispensing heads comprises at least two modeling material dispensing heads for dispensing the same modeling material.

According to some embodiments of the invention the plurality of dispensing heads comprises at least one support material dispensing head for dispensing support material, and wherein the control unit is designed and configured to reduce a dispensing rate of the at least one support material dispensing head when the operation mode is the second operation mode.

According to some embodiments of the invention the control unit is designed and to configured to control the at least two modeling material dispensing heads such as to maintain a predetermined ratio between amounts per unit area of the at least two types of modeling materials for each layer formed by the plurality of dispensing heads.

According to some embodiments of the invention the control unit is designed and configured to control the at least two modeling material dispensing heads and the at least one support material dispensing head such as to maintain the same amounts per unit area of modeling material and support material for each layer formed by the plurality of dispensing heads.

According to some embodiments of the invention the control unit is designed and configured to control the at least two modeling material dispensing heads such as to maintain a predetermined amount per unit area of modeling material for each layer formed by the plurality of dispensing heads.

According to some embodiments of the invention the control unit is designed and configured to control the heads to dispense the at least two types of modeling material so as to dynamically vary relative amounts of modeling materials per unit area dispensed thereby.

According to some embodiments of the present invention the solid freeform fabrication system comprises a controller capable of accessing a pixel map characterized by an even density of pixels, and composed of N different head pixel maps, each corresponding to a different dispensing head.

According to some embodiments of the invention at least one operation mode is characterized in that all head pixel maps are similar to each other and include substantially the same number of pixels.

According to some embodiments of the invention at least one operation mode is characterized in that at least two head pixel maps differ from each other and include different number of pixels.

According to some embodiments of the present invention the supply apparatus comprises a building material flow unit, controllable by the control unit and arranged for selectively allowing flow of building materials to the fabrication apparatus.

According to some embodiments of the invention the supply apparatus comprises a plurality of containers for holding the plurality of building materials, and wherein the flow unit is arranged to allow flow of different building materials to different dispensing heads.

According to some embodiments of the invention the supply apparatus comprise a plurality of containers for holding the plurality of building materials, and wherein the flow unit is characterized by at least a first state and a second state, the second state being defined such that at least two different dispensing heads are fed by different modeling materials, and the first state being defined such that all dispensing heads are supplied by the same modeling material.

According to some embodiments of the present invention the control unit is configured to allow dispensing of more than one modeling material at the same time.

According to some embodiments of the present invention the control unit is operative to dynamically change the operation mode by selecting a different operation mode from the plurality of operation modes.

According to some embodiments of the invention the selection of the different operation mode is according to the number of different modeling materials being dispensed by the dispensing heads.

According to some embodiments of the present invention the plurality of dispensing heads comprises a plurality of modeling heads having a total of N nozzle arrays, wherein the nozzles in each array are disposed along an indexing direction, the plurality of modeling heads being operable to scan a working surface along a scanning direction being at an angle to the indexing direction so as to form on the working surface a plurality of rows of modeling material along the scanning direction, wherein each row is formed by a nozzle.

According to some embodiments of the invention the N nozzle arrays are aligned along the scanning direction in a manner such that the rows of modeling material are formed on the working surface in a substantially uniform distribution along the indexing direction.

According to some embodiments of the invention the plurality of dispensing heads comprises a plurality of support heads having a total of N nozzle arrays wherein the nozzles in each array are disposed along an indexing direction, wherein each nozzle of support material is aligned along the indexing direction with one nozzle of modeling material.

According to some embodiments of the invention the N is a power of 2, and wherein the N nozzle arrays of modeling material are sequentially ordered with respect to the scanning direction at locations 1 to N such that rows formed by any nozzle array of modeling material at location K are symmetrically disposed between rows formed by all nozzle arrays of modeling material at locations 1 to K−1.

According to some embodiments of the present invention the plurality of dispensing heads comprises a plurality of nozzle arrays arranged in an interlaced manner, and wherein when the same material is supplied to all nozzle arrays, the object is fabricated during not more than half the required dispensing scans compared to when building the object by a single nozzle array.

According to some embodiments of the present invention the control unit is designed and constructed to ensure that the object's dimensions are rescaled along at least one direction so as to compensate for post-formation shrinkage of the object along the at least one direction.

According to some embodiments of the present invention regions having different modeling materials are rescaled according to a different rescaling factor.

According to some embodiments of the invention regions having different modeling material combinations contacting each other are rescaled according to a common rescaling factor.

According to some embodiments of the present invention the solid freeform fabrication apparatus comprises a three-dimensional printing apparatus. According to some embodiments of the present invention the solid free form fabrication apparatus comprises binder jet powder based apparatus. According to some embodiments of the present invention the solid freeform fabrication apparatus comprises a fused deposition modeling apparatus.

According to an aspect of some embodiments of the present invention there is provided an article of manufacturing, fabricated by solid freeform fabrication and having a distinguishable pattern thereon. According to some embodiments of the invention the pattern forms a relief on a surface of the article. According to some embodiments of the invention the pattern forms an intaglio in a surface of the article. According to some embodiments of the invention the pattern is flush with a surface of the article.

According to an aspect of some embodiments of the present invention there is to provided a method of solid freeform fabrication of an object from at least two different modeling materials, comprising: (a) determining a proportion of the at least two different modeling materials, using a lookup table or a mathematical formula; and (b) dispensing the at least two different modeling materials according to the proportion using a solid freeform fabrication apparatus having a plurality of dispensing heads.

According to an aspect of some embodiments of the present invention there is provided a method of solid freeform fabrication of an object from at least two different modeling materials, comprising: (a) determining a proportion of the at least two different modeling materials; and (b) dispensing the at least two different modeling materials using the solid freeform fabrication system.

According to some embodiments of the invention the determination of the proportion comprises Boolean comparison between bitmaps representing the at least two different modeling materials with bitmaps representing the object.

According to some embodiments of the invention the object comprises a spatial zone in which at least one attribute of the material continuously changes from one point to another.

According to some embodiments of the invention the at least one attribute is selected from the group consisting of hardness, solidity, elasticity, flexibility, color, translucency, electrical and/or magnetic behavior.

According to some embodiments of the invention the at least two modeling materials comprise a first non-solidifiable solidifiable modeling material and a second non-solidifiable modeling material, and wherein the first and the second non-solidifiable modeling materials mix after the dispensing to form a solidifiable mixed material.

According to an aspect of some embodiments of the present invention there is provided a method for solid free form fabrication, comprising fabricating at least two separate objects on a building tray using different modeling material combinations, wherein the dimensions of the at least two objects are rescaled along a direction so as to compensate for post-formation shrinkage of the objects along the direction, and wherein the scale factors along the direction of the at least two different objects are different.

According to some embodiments of the invention regions having different modeling material combinations that touch each other are rescaled according to a common resealing factor.

According to an aspect of some embodiments of the present invention there is provided a printing device for a three-dimensional printing apparatus, comprising: a movable printing assembly having a plurality of printing units; and a service assembly having a plurality of service stations; wherein the printing assembly is configured for docking near the service assembly such that a temporary fluid communication is established between at least one printing unit and at least one service station during the docking.

According to an aspect of some embodiments of the present invention there is provided a three-dimensional printing apparatus, comprising: the printing device; a control unit for controlling the printing assembly and the service assembly; and a building tray for receiving building material from the printing assembly and for carrying an object formed by the building material.

According to an aspect of some embodiments of the present invention there is provided a system for solid freeform fabrication of an object, comprising: the printing apparatus; and a building material supply apparatus configured to supply a plurality of building materials to the printing apparatus.

According to some embodiments of the present invention the service assembly is stationary.

According to some embodiments of the present invention the service assembly is movable.

According to some embodiments of the present invention the at least one service station is configured for refilling building material into the at least one printing unit via the temporary fluid communication.

According to some embodiments of the present invention the at least one service station is configured for cleaning the at least one printing during the docking.

According to some embodiments of the present invention at least one of the service assembly and the printing assembly comprises a plurality of actuating units configured for disconnecting and connecting the at least one printing unit from the printing assembly.

According to some embodiments of the present invention the service assembly comprises an arrangement of sensors for sensing presence of service means at the plurality of service stations, and the printing assembly comprises an arrangement of to sensors for sensing presence of the plurality of printing units.

According to some embodiments of the invention the sensors are configured for sensing amount of building material in the plurality of printing units.

According to an aspect of some embodiments of the present invention there is provided a method of registering data for solid freeform fabrication of an object, comprising: (a) selecting at least one material combination, and determining relative amounts of different materials in the material combination; and (b) recording the at least one material combination and the relative amounts in a computer readable medium; thereby registering the data.

According to some embodiments of the invention (a) further comprises associating a three-dimensional spatial distribution with each material combination.

According to some embodiments of the invention the determining the relative amounts, comprises performing experimentations with the different materials.

According to some embodiments of the invention the determining the relative amounts, comprises estimating the relative amounts based on properties of each of the different materials.

According to an aspect of some embodiments of the present invention there is provided a method of registering data for solid freeform fabrication of an object, comprising: (a) selecting a plurality of material combinations, each material combination being defined by at least two different materials and at least two relative amounts respectively corresponding to the at least two different materials; (b) for each material combination, associating three-dimensional spatial distribution for each material in the combination; and (c) recording the plurality of material combinations, the relative amounts and the three-dimensional spatial distribution in a computer readable medium; thereby registering the data.

According to some embodiments of the invention the method further comprising determining at least one material property corresponding to the material combination.

According to some embodiments of the invention the determining the at least one material property, comprises performing experimentations with the different materials.

According to some embodiments of the invention the determining the at least one material property, comprises estimating the at least one material property based on properties of each of the different materials.

According to an aspect of some embodiments of the present invention there is provided a method of solid free form fabrication, comprising; using a solid freeform fabrication apparatus having a plurality of dispensing heads for dispensing a plurality of different modeling materials such as to form a three-dimensional object, wherein the three-dimensional object comprises of at least two regions which differ from each other by at least one attribute.

According to some embodiments of the invention the at least two regions are made of different modeling material combinations, each combination comprising at least two different modeling materials, and the method further comprises selecting relative amounts of the at least two different modeling materials based on an attribute of a respective region.

According to an aspect of some embodiments of the present invention there is provided a method of solid freeform fabrication of an object, the object having a plurality of regions, the method comprising: (a) inputting data pertaining to shapes of the object and each of the plurality of regions; (b) for each region, inputting pre-registered data pertaining to a material combination corresponding to a respective region and to relative amounts of at least two different materials in the material combination; and (c) operating a solid freeform fabrication system for dispensing the at least two different materials based on the relative amounts.

According to some embodiments of the invention the pre-registered data pertaining to the material combination comprises data pertaining to a three-dimensional spatial distribution associated with the material combination.

According to some embodiments of the present invention the at least two different materials comprise a first non-solidifiable modeling material and a second non-solidifiable modeling material, and wherein a combination of the first and the second non-solidifiable modeling materials forms a solidifiable mixed material.

According to some embodiments of the invention (a) comprises: inputting data pertaining to shapes and properties of the object; and dividing the data into a plurality of datasets each representing a different region.

According to an aspect of some embodiments of the present invention there is provided a method of solid freeform fabrication, comprising: operating a solid freeform to fabrication system for dispensing at least two different modeling materials such as to form a three-dimensional object having a bulk region at least partially surrounded by a skin region, wherein the bulk region and the skin region are formed of different modeling material or modeling material combinations.

According to some embodiments of the invention the bulk region and the skin region have different elasticity.

According to some embodiments of the invention the method further comprising at least one buffer layer interposed between the bulk region and the skin region, the at least one buffer layer being formed of a modeling material or modeling material combination which is different from a modeling material or modeling material combination forming the bulk region.

According to an aspect of some embodiments of the present invention there is provided a method of solid freeform fabrication, comprising: dispensing at least one modeling material, at least one support material, and at least one additional material other than a modeling material and a support material, and at least partially solidifying the at least one modeling material, such as to form a three-dimensional object.

According to some embodiments of the invention the at least one additional material is at least partially interlaced with the modeling material.

According to some embodiments of the invention the at least one additional material comprises at least one non-solidifiable material.

According to an aspect of some embodiments of the present invention there is provided the solidification is executed such that at least part of the modeling material solidifies and the at least one additional material does not solidify.

According to some embodiments of the invention the at least one additional material and the at least one modeling material mix after the dispensing to form a solidifiable mixture.

According to some embodiments of the invention the method further comprising removing the at least one additional material so as to form a porous or hollow three-dimensional object.

According to some embodiments of the invention there is provided a method of solid freeform fabrication, comprising: operating a solid freeform fabrication system for dispensing at least one support material and at least two non-solidifiable materials, such as to form a three-dimensional object, wherein the at least two non-solidifiable material mix after the dispensing to form a solidifiable mixture.

According to an aspect of some embodiments of the present invention there is provided a method of solid freeform fabrication, comprising: providing a plurality of modeling materials and dividing the plurality of modeling materials into at least two categories; for each category, sorting the modeling materials in the category according to a predetermined criterion and using the sort for generating graphical representation of the modeling materials; using the graphical representation for selecting at least some modeling materials; and using a solid freeform fabrication system for fabricating the object from the at least some modeling materials.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is to stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 3a-c and 4a-c are fragmentary schematic illustrations of a supply apparatus, according to various exemplary embodiments of the present invention;

FIG. 11 is a schematic illustration of an object shaped as a cube made of composite material;

FIGS. 12a-b are schematic representations of bitmaps for two materials in a dispersed phase material structure, according to various exemplary embodiments of the present invention;

FIGS. 13a-b are schematic representations of bitmaps for two materials in laminate (XY) model structure, according to various exemplary embodiments of the present invention;

FIGS. 14a-b are schematic representations of bitmaps for two materials in IPN model structure, according to various exemplary embodiments of the present invention;

FIG. 15 is a schematic illustration of a construction according to the bitmap shown in FIG. 14a;

DESCRIPTION OF SPECIFIC EMBODIMENTS OF THE INVENTION

Figure 1A:
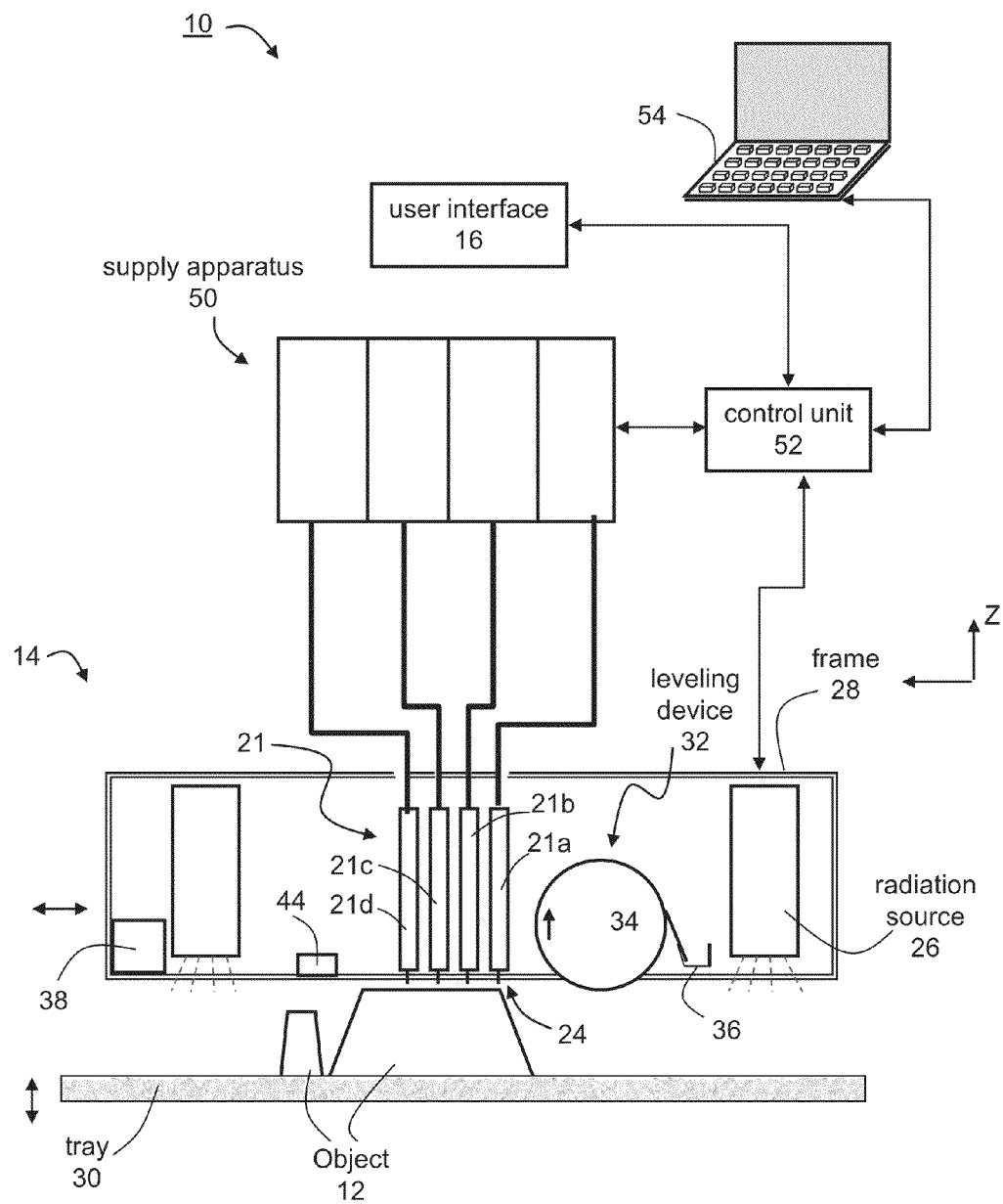
FIG. 1a is a schematic illustration of a system for solid freeform fabrication of one or more objects, according to various exemplary embodiments of the present invention.

The present embodiments comprise a system and method which can be used for solid freeform fabrication of an object. Specifically, the embodiments can be used to to fabricate an object by dispensing different types of materials from different dispensing heads.

The principles and operation of a system and method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The method and system of the present embodiments fabricate three-dimensional objects in a layerwise manner by forming a plurality of layers in a configured pattern corresponding to the shape of the objects.

The term "object" as used herein refers to a whole object or a part thereof.

Each layer is formed by solid freeform fabrication apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

The solid freeform fabrication apparatus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix for supporting the object or object parts during the fabrication process and/or other purposes, e.g., providing hollow or porous objects.

The modeling material is generally a composition which is formulated for use in to solid freeform fabrication and which is able to form a three-dimensional object on its own, i.e., without having to be mixed or combined with any other substance.

The final three-dimensional object is made of the modeling material or a combination of modeling and support material or modification thereof (e.g., following curing). All these operations are well-known to those skilled in the art of solid freeform fabrication.

Unless otherwise stated, the term modeling material refers to a material contained in a particular container of a solid freeform fabrication apparatus or a combination of modeling materials deposited from different containers of the apparatus. The modeling material may, for example, contain a component with biological or pharmaceutical activity, or with other activity or property. This component can, for example, be dispersed or dissolved in the modeling material. Alternatively, the modeling material itself may have such biological or pharmaceutical activity or property.

As further detailed hereinbelow the present embodiments contemplate the fabrication of an object by dispensing different materials from different dispensing heads. The present embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials in, or to effect occupation of substantially the same three-dimensional location or adjacent three-dimensional locations by two or more different materials so as to allow post deposition mixing of the materials thereby to form a composite material at the respective location or locations.

Any post deposition combination or mix of materials is contemplated. For example, once a certain material is dispensed may preserve its original properties. However, when it combines with another material or other dispensed materials which are dispensed at the same or nearby location a composite material having a different property or properties to the dispensed materials is formed.

The present embodiments thus enable the deposition of a broad range of material combinations, and the fabrication of an object which may consist of multiple different to combinations of materials, in different parts of the object, according to the properties desired to characterize each part of the object.

The present embodiments also contemplate several modes of operation, depending on the number of different materials which are to be used. In a first operation mode, all the dispensing heads of the system are operational throughout a building scan cycle in each location of the layer.

A building scan cycle can include one or more scans of the dispensing heads over the work area, e.g., a tray on which the object is formed. A single building scan cycle of the dispensing heads forms one layer of the object.

In this mode, post deposition combination can form a uniform mix or combination of materials. In a second operation mode, one or more dispensing head of the system is not operative during at least a part of the building scan cycle of the layer. This operation mode facilitates both post deposition combination, in which case the combination is not necessarily uniform or homogenous, and the deposition of different materials at different three-dimensional spatial locations.

Referring now to the drawings, FIG. 1 illustrates a system 10 for solid freeform fabrication of one or more objects 12, according to various exemplary embodiments of the present invention.

Figure 1B:
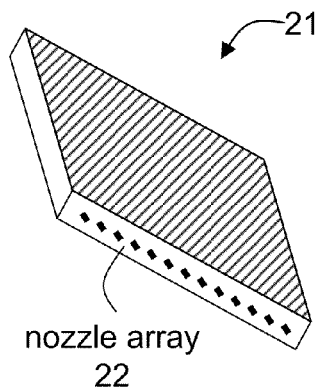
FIGS. 1b-d are schematic illustrations of dispensing heads of the system, according to various exemplary embodiments of the present invention.
Figure 1C:
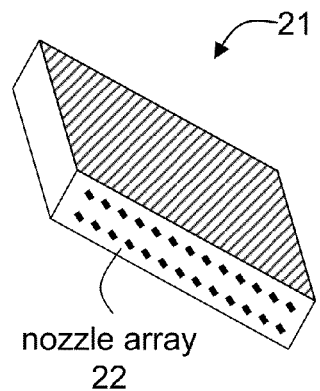

System 10 comprises a solid freeform fabrication apparatus 14 having a plurality of dispensing heads 21. Each head preferably comprises one or more nozzle arrays 22, through which a building material 24 is dispensed. Head 21 is better illustrated in FIGS. 1*b-c*, showing a dispensing head with one (FIG. 1*b*) or two (FIG. 1*c*) nozzle arrays.

Preferably, but not obligatorily, apparatus 14 is a three-dimensional printing apparatus, in which case dispensing heads 21 are printing heads, and the building material is dispensed via inkjet technology. This need not necessarily be the case, since, for some applications, it may not be necessary for the solid freeform fabrication apparatus to employ three-dimensional printing techniques. Representative examples of solid freeform fabrication apparatus contemplated according to various exemplary embodiments of the present invention include, without limitation, binder jet-powder base apparatus and fused deposition modeling apparatus.

Each dispensing head is optionally and preferably fed via a building material reservoir (not shown, see FIGS. 3*a-c* and 4*a-c*) which may optionally include a temperature control unit (e.g., a temperature sensor and/or a heating device), and a material level sensor. To dispense the building material, a voltage is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage. Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material. In the representative example of FIG. 1*d*, three dispensing heads 21*a*, 21*b* and 21*c* are illustrated. Each of heads 21*a* and 21*b* has one nozzle array, while head 21c has two nozzle arrays. In this Example, heads 21a and 21b can be designated for modeling material and head 21c can be designated for support material. Thus, head 21a can dispense a first modeling material, head 21b can dispense a second modeling material and head 21c can dispense support material. In an alternative embodiment, head 21c, for example, may comprise 2 physically separate structures, each having a single nozzle array. In this embodiment each of the two structures can physically be similar to heads 21a and 21b.

Yet it is to be understood that it is not intended to limit the scope of the present invention and that the number of modeling heads and the number of support heads may differ. Generally, the number of modeling heads, the number of support heads and the number of nozzles in each head are selected such as to provide a predetermined ratio, a, between the maximal dispensing rate of the support material and the maximal dispensing rate of modeling material. The value of the predetermined ratio, a, is preferably selected to ensure that at each fabricated layer, the height of modeling material equals the height of support material. Typical values for a is from about 0.6 to about 1.5.

As used herein the term "about" refers to ±10%.

For example, for a=1, the overall dispensing rate of support material is generally the same as the overall dispensing rate of the modeling material when all to modeling heads and support heads operate.

In a preferred embodiment, there are M model heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Figure 1D:
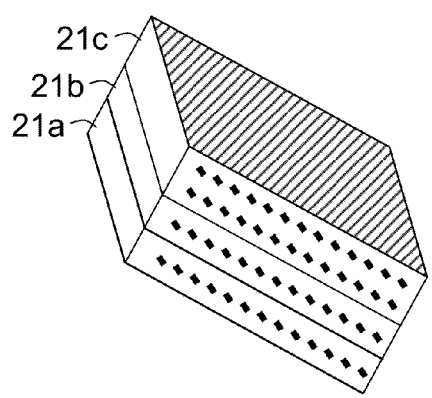

One configuration in which one support material head 21c and two modeling material heads 21a, 21b are employed is illustrated in FIG. 1d. In this configuration, the number of nozzle arrays in the support head is twice the number of nozzle arrays in each modeling head, but the overall number of nozzle arrays designated to dispense support material equals the overall number of nozzle arrays designated to dispense modeling material. When all nozzle arrays are characterized by the same dispensing rate, this embodiment corresponds to a=1, and when the nozzle arrays of head 21c are characterized by a dispensing rate which differ from the dispensing rate of the nozzle arrays of each of heads 21a and 21c, this embodiment corresponds to a≠1.

Apparatus 14 can further comprise one or more radiation sources 26, which can be, for example, an ultraviolet or visible or infrared lamp, or other sources of electromagnetic radiation, or electron beam source, depending on the modeling material being used. Radiation source 26 serves for curing or solidifying the modeling material.

Dispensing head 21 and radiation source 26 are preferably mounted in a frame or block 28 which is preferably operative to reciprocally move over a tray 30, which serves as the working surface. According to the common conventions, tray 30 is positioned in the X-Y plane. Tray 30 is preferably configured to move vertically (along the Z direction), typically downward. In various exemplary embodiments of the invention, apparatus 14 further comprises one or more leveling devices 32 which can be manufactured as a roller 34 or a blade. Leveling device 32 serves to straighten the newly formed layer prior to the formation of the successive layer thereon. Leveling device 32 preferably comprises a waste collection device 36 for collecting the excess to material generated during leveling. Waste collection device 36 may comprise any mechanism that delivers the material to a waste tank or waste cartridge.

Preferably, apparatus 14 comprises a sensing device 44 which may be, for example, embedded within leveling device 32 or may be external thereto. Sensing device 44 serves to determine whether a collision with object 12 has occurred or is expected to occur. Such a collision may be, for example, as a result of dispensed layers being too thick and/or inconsistent in thickness, and/or because of a mechanical malfunction of the dispensing head. Collision may also occur as a result of material spill or faulty material dispensing that may occur anywhere in the path of the dispensing head. For example, sensing device 44 may be or include an acceleration-sensing device, a shock sensor and the like.

According to a preferred embodiment of the present invention, apparatus 14 further comprises a cooling unit 38 for cooling object 12 and or apparatus 14. Unit 38 may comprise a blowing unit and/or a sucking unit, for respectively cooling apparatus 14 by sucking hot air or other substances out of apparatus 14 and/or drawing cool air or other substances in to apparatus 14 from the surroundings.

In use, dispensing heads 21 move in a scanning direction, which is referred to herein as the X direction, and selectively dispense building material in a predetermined configuration in the course of their passage over tray 30. The building material typically comprises one or more types of support material and one or more types of modeling material. The passage of heads 21 is followed by the curing of the modeling material(s) by radiation source 26. In the reverse passage of heads 21, back to their starting point for the layer just deposited, an additional dispensing of building material may be carried out, according to predetermined configuration. In the forward and/or reverse passages of heads 21, the layer thus formed may be straightened by leveling device 32, which preferably follows the path of heads 21 in their forward and/or reverse movement. Once heads 21 return to their starting point along the X direction, they may move to another position along an indexing direction, referred to herein as the Y direction, and continue to build the same layer by reciprocal movement along the X direction. Alternately, heads 21 may move in the Y direction between forward and reverse movements or after more than one forward-reverse movement. The series of scans performed by heads 21 to complete a single layer is referred to herein as a single scan cycle.

Once the layer is completed, tray 30 is lowered in the Z direction to a predetermined Z level, according to the desired thickness of the layer subsequently to be printed. The procedure is repeated to form three-dimensional object 12 in a layerwise manner.

In another embodiment, tray 30 may be displaced in the Z direction between forward and reverse passages of head 21, within the layer. Such Z displacement is carried out in order to cause contact of the leveling device with the surface in one direction and prevent contact in the other direction.

System 10 further comprises a building material supply apparatus 50 which supplies a plurality of building materials to fabrication apparatus 14 and a control unit 52 which controls fabrication apparatus 14 and supply apparatus 50 based on the operation mode of system 10. Control unit 52 preferably communicates with a data processor 54 which transmits digital data pertaining to fabrication instructions based on computer object data, e.g., in a form of a Standard Tessellation Language (STL) or a StereoLithography Contour (SLC) format. Typically, control unit 52 controls the voltage applied to each dispensing head or nozzle array and the temperature of the building material in the respective reservoir.

In various exemplary embodiments of the invention system 10 has at least two operation modes: in a first operation mode all modeling material heads operate, preferably at the same dispensing rate, during a building scan cycle, namely, all nozzles are operative throughout the building scan cycle in every location of the object layer. Since the different heads are not necessarily located in the same place (e.g., they can be located one after the other in the scanning direction), there is a certain time delay between each of the heads and nozzle rows. The term "location of the layer" refers to a small collection of pixels in the X-Y plane.

In a second operation mode at least one dispensing head is not operative during the building scan cycle in at least one location. In this mode, in order to provide a layer of the same thickness and resolution as would be produced by operating in the first operation mode, heads 21 are required to carry out more scans in order to complete a full layer.

In the first operation mode, the dispensing heads may dispense one type of modeling material and a support material or alternatively may dispense more than one to type of modeling material and a support material, where the more than one modeling materials are uniformly dispensed at a fixed ratio throughout the building scan cycle. For example, using 2 modeling materials, the ratio can be 1:1, and for 3 modeling materials, the ratio can be 1:1:1.

In the second operation mode, the dispensing heads dispense at least two types of modeling materials and a support material. The second operation mode can be employed in more than one way: in one embodiment, not all heads are used or activated in a building scan cycle. In another embodiment, all model heads are activated to deposit their modeling materials in the course of building up a layer, however at any given point or time during build up of the layer, not all heads are activated to deposit their material. For example, in a single layer scan, materials A and B can be deposited in a ratio of 3:1 in one region of the object layer, and materials A and C (where material C is deposited from another, separate head) deposited in a 2:1 ratio in another region of the same object layer. In any case, the second operation mode is characterized in that at any given point of the solid freeform fabrication process, at least one of the heads may not be activated to deposit material in a scan cycle.

The operation mode can be selected automatically by control unit 52 or may be selected by the operator e.g., using data processor 54 or a user interface 16 communicating with unit 52, according to the final model or object desired to be produced. For example, control unit 52 or can automatically choose the first operation mode when the object or object parts to be fabricated are specified as built of the same single modeling material, and when this modeling material is already fed into all the modeling material dispensing heads, or when it is desired to build an object using a uniform mix of the modeling materials already fed into the modeling material dispensing heads. Control unit 52 or can automatically choose the second operation mode when the object or object parts to be fabricated are specified as built of more than one modeling material without mixing or with partial mixing (i.e., mixing only at some, but not all, three-dimensional locations) or with nonuniform mixing. The automatic selection of operation mode can be manually bypassed at any time using processor 54 or interface 16, at the user's discretion.

The system of the present embodiments enables selection of modeling materials from a given number of modeling materials and/or materials intended to comprise part to of the object being fabricated, to define desired combinations of the selected materials and define the 'spatial location' of their deposition (combined or separate) within the layer, thus enabling the formation of a broad range of materials (i.e., material combinations), having a broad range of material attributes or properties, and enabling the fabrication of an object which may consist of multiple different combinations of modeling materials, in different parts of the object, according to the properties desired to characterize each part of the object.

A three-dimensional object may be created by using suitable software such as CAD software, which exports the virtual object to an SFF machine by a standard portable file format, e.g., STL format which is legible by the controller of the SFF machine. The SFF user may divide or split the virtual object to be fabricated into a number of separate parts or zones, which are referred to herein as "regions". A region in the object is thus a sub-volume of the object confined in one or more close surfaces which do not intersect with each other.

Division of the virtual object is done in order to enable assigning of different modeling materials or modeling material combinations or structures to the different regions. In one embodiment, the different regions are saved as different STL files or different parts of an STL file, all files or parts of files referring to the same axes system and origin. The process of division into separate regions and their conversion to STL files may be carried out generally as known in the art, for example, generally as described in U.S. Pat. No. 5,768,134, assigned to Materialise N.V. A group of regions or STLs may therefore make up a whole object or whole part thereof.

In a preferred embodiment of the present invention, deposition of the modeling material(s) is determined according to the thus defined regions, e.g., the specific modeling materials to be used, and their combination and/or spatial deposition within the region are defined in the software, as well as the spatial definition of the regions themselves within the object layer, all according to the pre-defined properties desired for each part of the final object. Typically, definition of region attributes, e.g., types of modeling material and their combination in a given region may be defined by the software at or after the time of division of the virtual object into regions. In a preferred embodiment, for any given region, a user or operator of the apparatus of the invention to may introduce definitions, e.g., via user interface software of the apparatus. For example, the operator may select a specific region and select modeling materials and/or material combinations for the thus defined region, according to the properties desired for each respective region. A non typical example of this is defining one modeling material or material combination for the periphery or boundary of the region and a different material or material combination for the remainder. A useful example of this is printing objects with hard material in the bulk but soft material on the skin.

Control unit 52 controls supply apparatus 50 so as to distribute the various building materials between the different dispensing heads according to the selected operation mode.

Figure 2A:
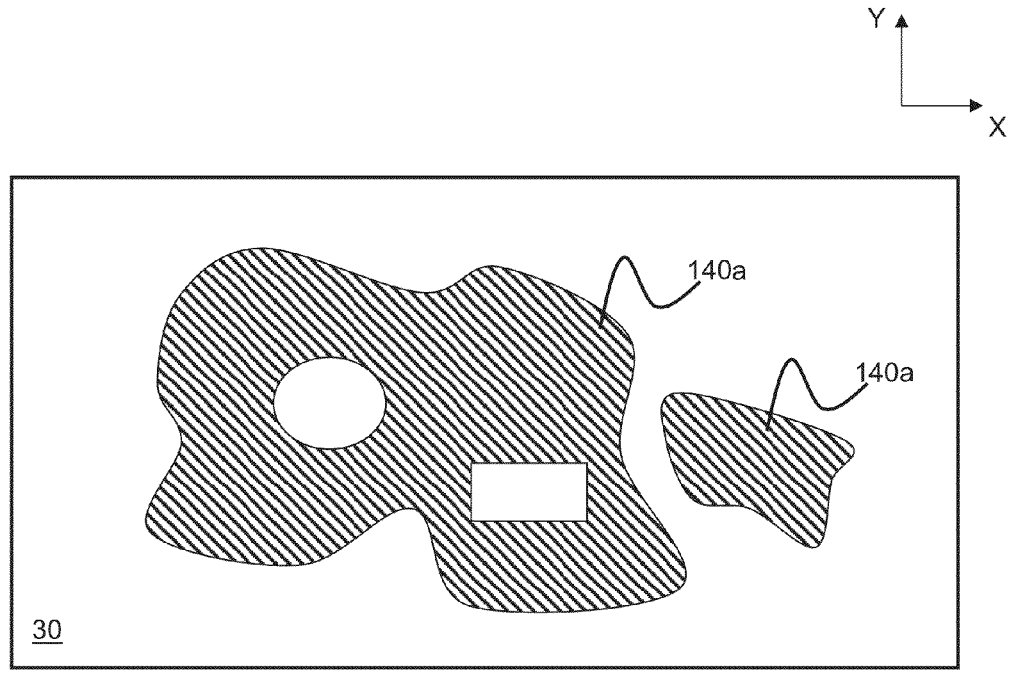
FIG. 2a is a cross sectional view of two objects fabricated from a single modeling material, according to various exemplary embodiments of the present invention.

As aforesaid, the first operation mode can be selected either for fabricating objects using a modeling material from a single material container, or for fabricating objects made of a uniform mix from different modeling material containers. The relative amount of the ith modeling material is preferably $N_i/m$ where m is the number of modeling heads and $N_i$ is the number of heads that receive the i-th modeling material. A cross-sectional view of two objects, which are simultaneously fabricated on tray 30 according to a preferred embodiment of the present invention from a single modeling material 140a is illustrated in FIG. 2a.

Figure 2B:
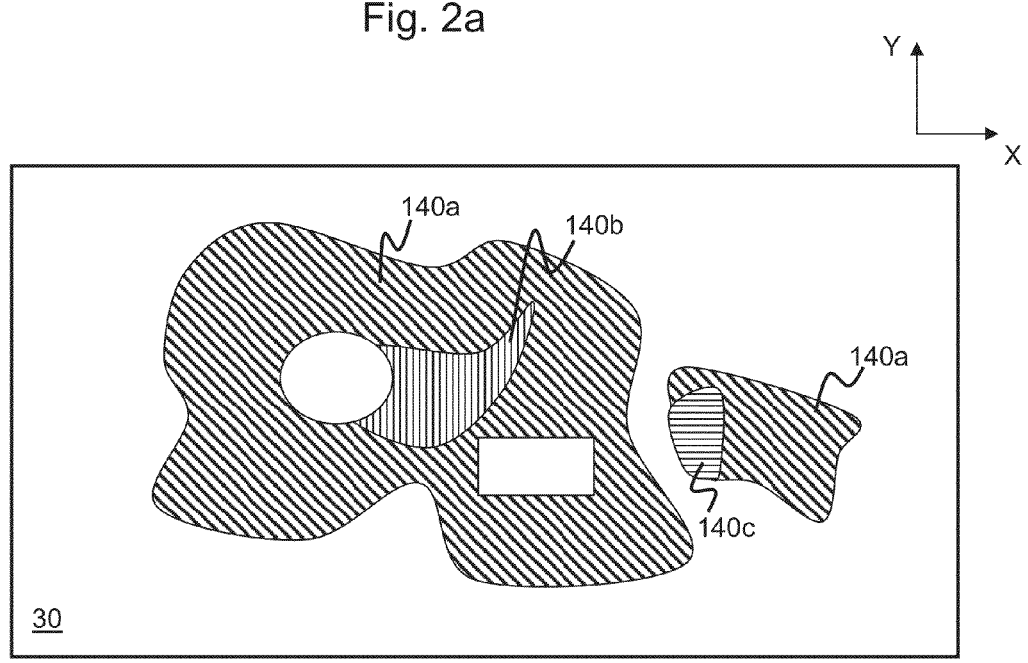
FIG. 2b is a cross sectional view of two objects fabricated from three different modeling materials, according to various exemplary embodiments of the present invention.

The second operation mode is preferably selected when it is desired to fabricate objects using different modeling materials and/or different combinations of modeling materials in different regions, or when a single scan cycle is used to simultaneously fabricate layers of different objects with different modeling materials and/or material combinations on the same working surface. A cross sectional view of two objects, which are simultaneously fabricated on tray 30 from three different modeling materials 140a, 140b and 140c, according to a preferred embodiment of the present invention, each occupying a distinct region, is illustrated in FIG. 2b.

The second operation mode is particularly useful for the fabrication of objects made of (or made partially of) composite material. For example, objects made of two or more materials having different physical properties e.g., mechanical, thermo-mechanical, optical, acoustic or electrical, either in isotropic or anisotropic manner, either singly or in any combination. For example, in one embodiment the second operation mode is selected to fabricate objects having an anisotropic or nonuniform to mechanical-strength; in another embodiment the second operation mode is selected to fabricate objects having an anisotropic or nonuniform elasticity; in an additional embodiment the second operation mode is selected to fabricate objects having an anisotropic or nonuniform refractive index; in a further embodiment the second operation mode is selected to fabricate objects having an anisotropic or nonuniform color and the like.

Predetermined combinations of different modeling materials having different properties may be selected to be deposited in different regions, to create a composite material having properties different to those of the dispensed material, or that exhibit a combination of their properties. The resulting properties may differ according to the combination and/or relative amounts of the materials dispensed. The materials to be used in different combinations as well as the structure, e.g., spatial/relative deposition, of their combinations are predetermined according to the properties desired to be achieved in the final composite material forming the object or parts of the object.

A resulting object, according to various exemplary embodiments of the present invention, can thus have properties which differ within the object itself, e.g., a property which increases or decreases from one side of the object to another, or alternating properties within the object. For example, selecting one modeling material which is rigid after curing and another which is flexible or elastic after curing, can result in a composite material object in which some parts of the object are be more rigid than others, some more flexible than others, or the object may be rigid, e.g., on the outside and in the center, but flexible everywhere else. If, for example, a greater amount of rigid material is dispensed than the amount of flexible material, the fabricated object material is less rigid than the selected rigid material, but not as flexible as the selected flexible material. Different regions of the fabricated object can thus have differing material properties, where a region can be a layer, part of a layer or a number of layers, e.g., a horizontal block of layers, or other structural arrangements, and thus the material properties may vary within a layer or between different blocks of layers. A composite material may also have colors that differ throughout the composite material, depending on relative amounts and spatial dispensing of a number of different colored materials.

The different types of modeling materials may remain separate and distinct within the fabricated object or they may be mixed during the fabrication process. In the to single material mode, if, for example, two modeling materials are used, the materials themselves may combine into a single material, or they may be deposited such that each material remains distinct, however their uniform deposition in droplets of material next to one another forms a uniform, homogenous mix. In multi material modes, two or more modeling materials may be selected to be dispensed individually in parts or regions, and/or combined in others, where the combination may be made by dispensing relative amounts of each material in different specified target locations or groups of target locations, or by dispensing two or more types of modeling materials within the same group of target locations.

The relative amounts of different modeling materials which are dispensed per layer or a portion thereof can be dynamically varied by unit 52 during the fabrication of the object, particularly when it is desired to fabricate an object having nonuniform or anisotropic properties. Unit 52 preferably receives from processor 54 digital data describing the relative amounts and controls the dispensing rate of the individual dispensing rate according to the data. The variation of relative amounts can be made either in continuous or discrete manner.

The ability of the system of the present embodiments to utilize two or more different modeling materials, makes it is possible to use many more and more varied materials in solid free fabrication than has been possible to date in conventional solid freeform fabrication techniques as well as providing many different possibilities for combining multiple materials, according to the final object and/or object properties desired to be obtained.

For example, building materials which have a greater tendency to shrink as a result of the polymerization process are not usually suitable for use in traditional solid freeform fabrication apparatus. The system of the present embodiments usefully provides a solution to this problem. For example, the system of the present embodiments can fabricate parts or objects in which the outside surfaces of the part or object are made of one material, while the rest of the part or object comprises a different material. In this example, the internal regions may be fabricated of a material which lacks mechanical strength, such as a gel or liquid, but having other desirable properties such as being easily removable, e.g., in order to create a hollow object, or easily burnt to without leaving ash or other traces.

In one embodiment of the invention, two or more modeling materials may be dispensed, where one or both of the materials may not have the properties required to allow the building of the desired object. The combination of the two materials can provide a functional modeling material. For example, one of the materials may not solidify during the fabrication process, but remain in liquid, gel, paste or other non-solid or semi-solid form, while the other material does solidify during the fabrication process. The solidified material can "contain" the non-solidified material, or, alternatively, the non-solidified material can be drained, burnt out or otherwise removed once the process is complete so as to provide a model which is hollow or porous.

In another embodiment of the invention, two or more modeling materials may be dispensed where one material may have too low reactivity to be used as a modeling material in a specific system, as if used alone it would produce an object having poor definition and low printing quality, while another material has the appropriate reactivity. In this example, it may be noted that one of the basic properties of a UV curable formulation is its reactivity to UV radiation. Reactivity is generally obtained by a suitable combination of monomers, oligomers, photoinitiator and photoinitiator concentration. Acrylic monomers and oligomers (as opposed to methacrylic) are especially appropriate due to their relatively high intrinsic reactivity, meaning that acrylic formulations can use relatively low concentrations of photoinitiator. Due to the relatively low intrinsic reactivity of methacrylic components, it is rather difficult to use them in the preparation of formulations. The lack of reactivity of a formulation directly affects its printing quality. The use of a formulation with low reactivity would produce an object with undefined and inexact edges and/or surfaces.

Methacrylic components generally have valuable properties such as a lower shrinkage ratio and higher Tg (glass transition temperature) than acrylic components, however they have lower reactivity than acrylic components. This problem may be solved using the system of the present invention, wherein one modeling material is used which has high reactivity, e.g., an acrylic formulation, and another modeling material which has low reactivity, e.g., methacrylic formulation. The high reactivity formulation may be used to surround the low reactivity formulation in each layer and thus the to object's surfaces would consist of the reactive formulation and the core of the object of the low reactivity formulation. As a consequence the quality of the periphery of the object is assured; since this characteristic requires high reactivity (the quality of periphery comprises wall smoothness and edge sharpness). The accuracy of the object is assured too since deformation of the bulk, which is brought about by shrinkage, is minimized. In this way, the valuable properties of low reactivity components can be exploited. Other types of low reactivity formulations may be used, including, for example, UV cationically initiated polymerizable formulations.

Although the system according to embodiments of the invention enables users to build articles comprised of combinations of building materials, e.g., composite materials, and offers the use of a large number of different material combinations for this purpose, the present inventors discovered that there is need for a method and/or utilities for providing the user with such information, e.g., possible combinations and their properties, in a user-friendly and systematic way, e.g., via user interface software.

In one embodiment of the present invention, a user or operator specifies using processor 54 the modeling materials to be dispensed and their combinations, in order to build an object or object part with desired properties. Processor 54 may provide information via a table, scale, spectrum, matrix, drop-down menus or other means about available materials and/or possible material combinations as well as tools for selection of such materials and/or material combinations. For example, a scale may be provided ranging from a material having 100% of property A and 0% of property B at one end, and another material having 0% of property A and 100% of property B at the other end, where along the scale are a number of different materials providing increasing/decreasing percentages of each property accordingly.

Generally, the modeling materials can be divided into two or more categories. For each category, the modeling materials in the category can be sorted according to a predetermined criterion. A graphical representation of the sorted materials can then be generated. From the graphical representation, at least some modeling materials can be selected for the solid freeform fabrication of the object. As a representative example for this procedure, consider the following protocol.

(i) sort the possible material combinations into to 2 categories: rubber-like (elastomer) and plastic-like (rigid);

(ii) sort the rubber-like materials according to percent of elongation and shore;

(iii) sorting the plastic like materials according to percent of elongation and heat distortion temperature (HDT);

(iv) graphically depict the sorted combinations (see, e.g., Tables 1 and 2 below, in which M1-M10 represent materials or material combinations); and (v) provide the user with the option and ability to select one or more combinations and assign them to an article or part of an article to be built.

TABLE 1

| Rigid | | | | | | | | | | | | | | |
|---|---|---|---|---|---|---|---|---|---|---|---|---|---|---|
| HDT | | | | | | | | | | | | | | |
| 60 | | | | | | | | | M4 | | | | | |
| 50 | | M1 | | | | | | | | | | | | |
| 40 | | | | | M2 | | | | | | | | | |
| 30 | | | | | | | | | | | | | | |
| 20 | | | | | | | | | | | | | | |
| 10 | | | | M5 | | | | | | | M3 | | | |
| 0 | 2 | 4 | 6 | 8 | 10 | 12 | 14 | 16 | 18 | 20 | 22 | 24 | 26 | Elongation |

TABLE 2

| Elastomer | | | | | | | | | | | | | | |
|---|---|---|---|---|---|---|---|---|---|---|---|---|---|---|
| Shore A | | | | | | | | | | | | | | |
| 0 | M6 | | | | | | | | | | | | | |
| 20 | | | | | | | | | | | | | M9 | |
| 40 | | | | | | | M7 | | | | | | | |
| 60 | | | | | | | | | | | | | | |
| 80 | | | | | M10 | | | | | | | | | |
| 100 | | | | | | | | | | M8 | | | | |
| 0 | 20 | 40 | 60 | 80 | 100 | 120 | 140 | 160 | 180 | 200 | 220 | 240 | 260 | Elongation |

In various exemplary embodiments of the invention the throughput characterizing the first operation mode is larger than the throughput characterizing the second operation mode. In the second operation mode, some dispensing heads may not be fully operative during the entire scan cycle or parts of it, resulting in lower throughput. In the first operation mode, the throughput is higher because all the dispensing heads operate throughout the scan cycle.

In the second operation mode, for example, some of the dispensing heads dispense one modeling material and some dispense another modeling material, requiring the heads to make more scan passes in order to complete a full scan cycle while producing a layer with the same thickness and resolution as in first operation mode.

For example, suppose that apparatus 14 comprises N modeling material heads (N≥2) each capable of dispensing modeling material at certain maximal rate. According to a preferred embodiment of the present invention the overall throughput of apparatus 14 when the same modeling material is supplied to all dispensing heads is N times larger (i.e., at least to times larger) than the overall throughput when a different modeling material is supplied to each dispensing head. Control unit 52 preferably controls the modeling material dispensing heads and the support material dispensing heads such as to maintain a predetermined ratio between the amounts of modeling material and support material for each layer.

The modeling material dispensing heads are preferably selected such that at least two, or preferably all modeling material dispensing heads have generally similar characteristic dispensing rates. Similarly, at least two, more preferably all support material dispensing heads have generally similar characteristic dispensing rates.

As used herein the term "generally similar", when used in conjunction to a miserable quantity (such as dispensing rate) refers to the same±10%.

Similar characteristic dispensing rates can be readily achieved by providing each respective head (modeling or support) with the same number and type of nozzles in array 22. Additionally or alternatively, the operation of system 10 can be preceded by a calibration step in which the voltage supplied to each head is tuned to achieve the desired rate.

As stated, the overall dispensing rate of support material is preferably the same (or multiplied by a) as the overall dispensing rate of modeling material when all heads operate. In various exemplary embodiments of the invention control unit 52 is designed and configured to reduce the dispensing rate of the support material heads when system 10 is in the second operation mode. This can be done, for example, by reducing the bias voltage on the support material heads or by temporarily disabling some of the nozzles in array 22. This can also be achieved by disabling one or more of the support heads (if more than one support head exists).

The advantage of the reduction of the dispensing rate of the support material in the second operation mode is to maintain equal layer heights for the modeling and support material. In various exemplary embodiments of the invention, for N different modeling materials, the reduction in dispensing rate is by a factor of N. For example suppose that there are 3 modeling heads each having 2 linear arrays of the same number of nozzles, and that there is a single support head having 6 arrays of nozzles of the same number. Suppose further that each modeling head is designated to dispense a different modeling material, i.e., in this example N=3.

In the above example, when system 10 operates in the first operation mode, all 6 arrays of modeling materials and all 6 arrays of support material dispense their respective materials throughout a scan cycle in every location, according to the model (bit) map and support (bit) map respectively. When system 10 operates in the second operation mode, in which each model head dispenses a different material, the building speed of objects is reduced to one third because there are locations in which only one head (one third of the model nozzles in the present example) dispenses material. This is despite the fact that the dispensing rate of the modeling heads or of the heads' nozzles is unchanged.

The model map in other locations where a mix of different materials is dispensed, is planned in such a way that in every location the material from all 3 heads together is dispensed at ⅓ rate (in one example this is achieved by reduced density of pixels in the model map of the individual heads). In order to prevent the support structure being built at a greater pace than the model, the support head is operated at a lower dispensing rate than that of the first operation mode. For example, in the last example of 6 support arrays, when printing double or triple modeling material mode, only 2 or 3 support arrays are operated respectively.

In this example therefore, when building an object or part thereof from a single material in the second operation mode, the 2 arrays of the desired modeling material would have to scan the layer three times more than if all 6 arrays of modeling material were active to deposit the desired modeling material, while interlacing between each scan (moving the heads in the Y direction between each scan), in order to deposit the same amount of modeling material to form a layer as in the first operation mode.

Reference is now made to FIGS. 3a-c and 4a-c, which are fragmentary schematic illustrations of a supply apparatus 50, according to various exemplary embodiments of the present invention. Apparatus 50 preferably comprises a plurality of containers 58 for holding the building materials. In the fragmentary illustration of FIGS. 3a-c and 4a-c there are two such containers 58a and 58b, for holding modeling materials to be supplied to dispensing heads 21a and 21b, but it is to be understood that apparatus 50 can comprise any number of containers, including one or more containers for holding support materials. Apparatus 50 further comprises a building material flow unit 60 arranged for selectively allowing flow of building materials to fabrication apparatus 14. More specifically, unit 60 selectively allows flow of materials to reservoirs 56a and 56b of dispensing heads 21a and 21b.

The flow of materials into reservoirs 56 is selective in the sense that a material from a particular container can be either delivered or not delivered to a particular reservoir. In various exemplary embodiments of the invention, unit 60 is designed and constructed such that there is at least one operation mode in which at least one container of modeling material supplies modeling material to two or more reservoirs of modeling head. Optionally and preferably unit 60 is designed and constructed such that there is at least one operation mode in which at least one container of support material supplies support material to two or more reservoirs of support heads. Additionally, unit 60 is designed and constructed such that there is at least one operation mode in which different containers supply materials to different reservoirs.

This can be achieved in more than one way. In the embodiments illustrated in FIGS. 3a-c, unit 60 comprises an arrangement of conduits 62, valves 64 and/or pumps 66. Each valve can assume an open state in which material is allowed to flow in the conduit at which the valve is introduced and a closed state, in which it does not allow to flow of material therethrough. An open valve is illustrated in FIGS. 3a-c as a square and a closed valve is illustrated as a square filled with a cross.

Valves and conduits suitable for the present embodiments are found in, e.g., U.S. Publication No. 20060127153, the contents of which are hereby incorporated by reference.

Unit 60 can assume several states. FIG. 3a illustrates a state of unit 60 in which the valves at the exits of the containers are open but no mixing of materials is allowed. Thus, in this configuration, container 58*a* supplies material to reservoir 56*a* but not to reservoir 56*b*, and container 58*b* supplies material to reservoir 56*b*, but not to reservoir 56*a*. This configuration is useful in embodiments in which different heads dispense different materials (e.g., in the second operation mode, or in the first operation mode in which materials are mixed during their deposition).

FIG. 3*b* illustrates the same combination of valve states as in FIG. 3*a*, but with the same modeling material in both containers. This embodiment is useful in the first operation mode whereby all heads dispense the same material.

FIG. 3*c* illustrates a state of unit 60 in which the valve at the exit container 58*a* is closed, the valve at the exit of container 58*b* is open, and the valves on conduits which allow flow of material from container 58*b* to reservoirs 56*a* and 56*b* are open. Thus, in this configuration, container 58*a* does not supply material, and container 58*b* supplies material to both reservoirs 56*a* and 56*b*. This embodiment is also useful in the first operation mode.

Figure 4A:
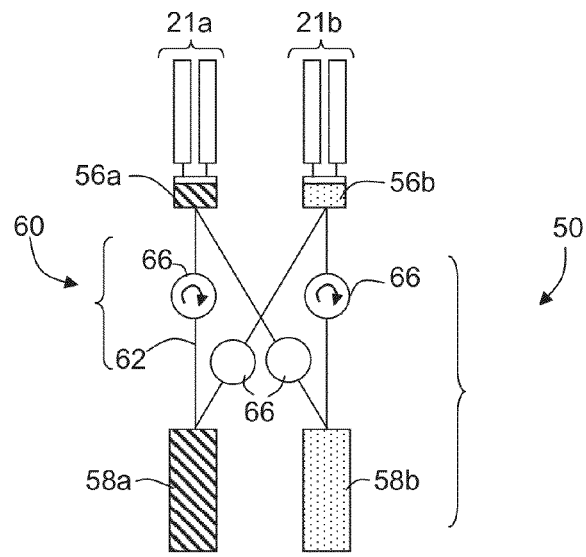
Figure 4B:
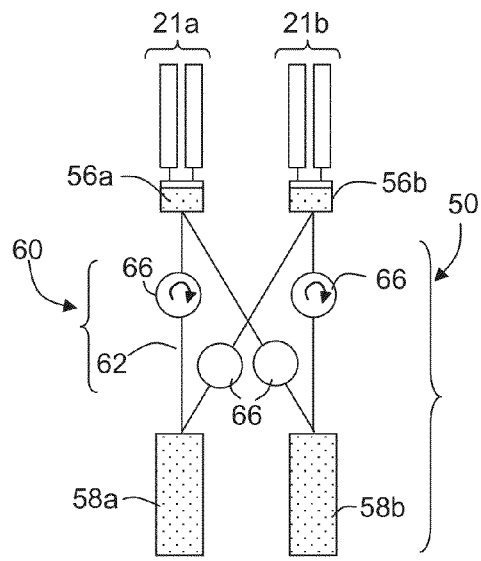
Figure 4C:
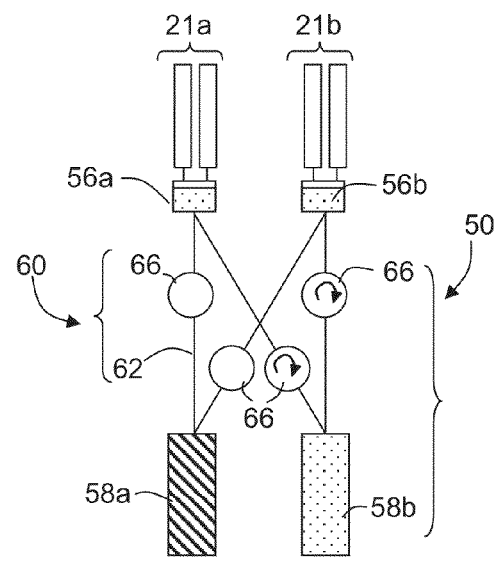

FIGS. 4*a*-*c* illustrate an embodiment in which unit 60 comprises an arrangements of conduits 62 and pumps 66.

Each pump can assume an operative state in which it generates flow of material and a non-operative state in which it does not allow flow of material. An operative pump is illustrated in FIGS. 4*a*-*c* as a circle with circular arrow, and a non-operative pump is illustrated in FIGS. 4*a*-*c* as an empty circle.

FIG. 4*a* illustrates a state of unit 60 in which the pumps generate flow of material from container 58*a* to reservoir 56*a* but not to reservoir 56*b*, and flow of material from container 58*b* to reservoir 56*b* but not to reservoir 56*a*. This configuration is useful in embodiments in which different heads dispense different materials (e.g., in the second operation mode, or in the first operation mode in which to materials are mixed during their deposition).

FIG. 4*b* illustrates the same combination of pump states as in FIG. 4*a*, but with the same modeling material in both containers. This embodiment is useful in the first operation mode whereby all heads dispense the same material.

FIG. 4*c* illustrates a state of unit 60 in which the pumps at the exit of container 58*a* are not operative, but the pumps at the exit of container 58*b* are operative, such that container 58*a* does not supply material, and container 58*b* supplies material to both reservoirs 56*a* and 56*b*. This embodiment is also useful in the first operation mode.

Also contemplated are different combinations of the above states. For example, when there are four modeling heads, unit 60 can assume the state as illustrated in FIG. 3*b* or 4*b* for two heads and the state as illustrated in FIG. 3*c* or 4*c* for the other two heads, thus allowing flow of materials from three containers to four heads.

When it is desired to dispense a single modeling material during a particular scan cycle of apparatus 14, system 10 can operate either in the first operation mode, or in the second operation mode. In the latter case, only dispensing heads designated to dispense the particular modeling material (or materials to be uniformly combined) operate during the scan cycle, while other modeling material heads are not operative and consequently the support material heads are also partially operative, according to the desired ratio between the overall dispensing rates of modeling materials and support material.

In the former case (the first operation mode) all the heads are operative throughout the scan cycle, and are fed by the same modeling material or materials. This can be achieved, for example, using the combination of valve states illustrated in FIG. 3*b*-*c* or the combination of pump states illustrated in FIGS. 4*b*-*c*. In the embodiment in which all the containers of apparatus 50 hold the same modeling material (e.g., FIGS. 3*b* and 4*b*), the scan cycle is preferably preceded by a step in which containers holding other modeling materials are replaced. Additionally, reservoirs and conduits filled with other modeling materials are preferably emptied, e.g., by performing one or more purging cycles, before commencing or continuing the fabrication step. If so required, unit 52 can adjust the applied voltage and/or temperature in the respective reservoirs. In the embodiment in which one or more containers supply the modeling material to all the heads (e.g., FIGS. 3*c* and 4*c*), the scan cycle is preferably preceded only with purging cycles and optionally voltage and temperature adjustments, without replacement of to containers.

For scan cycles of a single modeling material, the operation in the first operation mode is preferred from the stand point of higher throughput. The first operation mode, as described herein, may also comprise deposition, for example of two different materials, where such two different materials are dispensed in a fixed ratio throughout the layer.

When it is desired to dispense a mix or a varying mix of modeling materials during a scan cycle, system 10 preferably functions in the second operation mode according to the above or similar principles. For example, when a number of different objects are being printed on a tray, each object comprising different materials and/or different combinations of materials, or when an object comprises a number of different parts or regions, each comprising different materials and/or different combinations of materials.

Thus, according to the presently preferred embodiment of the invention unit 60 assumes the state in which different containers supply different building materials to different dispensing heads (e.g., as illustrated in FIG. 3*a* or 4*a*). In the first operation mode, where all heads operate during the scan cycle, all heads may be fed by the same containers, or all containers may contain the same material. In multiple modeling material mode, each modeling material is dispensed from a different head, each head being supplied by a different container, and the dispensed materials are optionally mixed or interspersed amongst each other, upon contacting the working surface.

When all dispensing heads are operative at the same time, the combined dispensing rate is higher than the dispensing rate of each individual head. When two materials are used in the first operation mode, unit 52 controls apparatus 50 such that the materials are dispensed at a fixed dispensing rate according to a fixed 1:1 ratio. The above procedure ensures that the layer is fabricated with a homogenous mixture of modeling materials.

Figure 5:
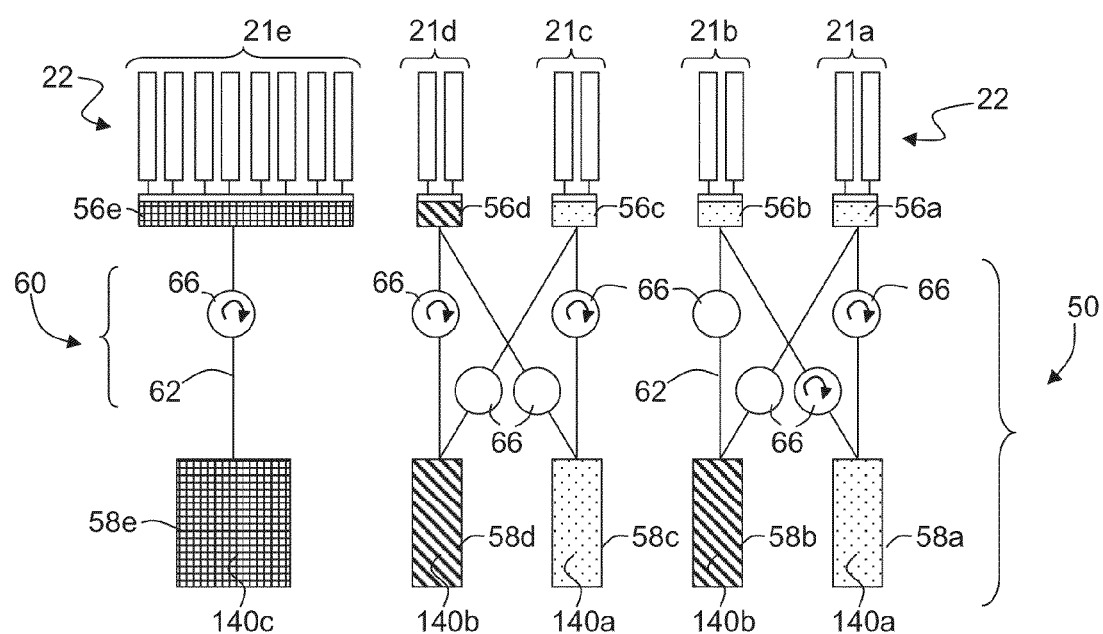
FIG. 5 is a schematic illustration of the supply apparatus and the dispensing heads in a preferred embodiment in which there are four modeling heads, each composed of two nozzle arrays, and one support head composed of eight nozzle arrays.

In some cases a layer made of a mixture of different modeling materials at uneven, but predetermined mix ratio can be obtained in the first operation mode, either by introducing the same modeling material to more than one container, or by selecting the state of unit 60 such that one or each of several modeling material containers supplies material to more than one modeling heads. A representative example is shown to in FIG. 5, which is a schematic illustration of supply apparatus 50 and heads 21 in an embodiment in which there are four modeling heads 21*a*-*d* having the same dispensing rate, and one support head 21*e* with a dispensing rate which is four times the dispensing rate of a model head. The dispensing rates of heads 21*a*-*d* are represented in FIG. 5 by two nozzle arrays 22 per head, and dispensing rate of head 21*e* is represented by eight nozzle arrays 22.

In the present example, apparatus 50 comprises one support material container 58*e* holding a support material 140*c* and four modeling material containers 58*a*-*d*, where containers 58*a* and 58*c* hold a first type of modeling material 140*a* and containers 58*b* and 58*d* hold a second type of modeling material 140*b*. Unit 60 comprises an arrangement of conduits 62 and pumps 66, as described above. The state of unit 60 is selected such that all the pumps at the exits of container 58*b* are non-operative, container 58*a* supplies material 140*a* to reservoirs 56*a* and 56*b* of heads 21*a* and 21*b*, respectively, container 58*c* supplies material 140*a* to reservoir 56*c* of head 21*c* and container 58*d* supplies material 140*b* to reservoir 56*d* of head 21*d*. When system 10 operates in the first operation mode, all the nozzle arrays of all modeling and support heads dispense the respective material during a scan cycle at any location along the scanning location, and the layer is formed at an elevated throughput from a mixture of materials 140*a* and 140*b*, for example at a mix ratio of 3:1.

During the fabrication of one or more objects having multiple layers, selected layers can be formed at high throughput from an even mixture of modeling materials while system 10 operates in the first operation mode, e.g., according to the principles described above in conjunction with FIG. 5, while other layers can be formed at lower throughput from one modeling material or a plurality of non-mixed modeling materials while system 10 operates in the second operation mode. The present embodiments thus facilitate dynamic switching between different operation modes of system 10 during the fabrication process of the object(s). The switching can be done either by the operator who instructs unit 52, e.g., using data processor 54 or user interface 16, to change the operation mode or it can be done automatically by unit 52 according to fabrication data received from processor 54.

Figure 6:
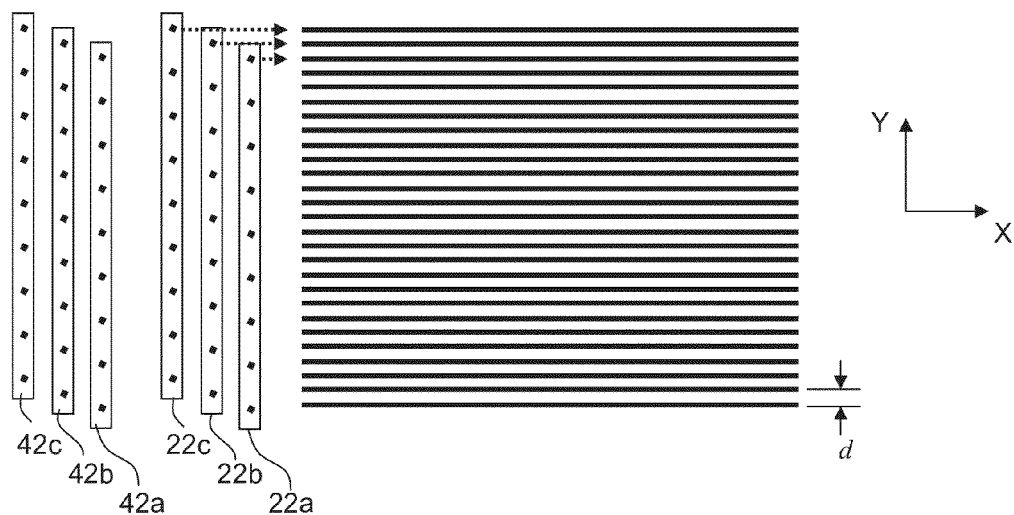
FIGS. 6-7 are schematic illustrations of the registration of the nozzle arrays of the various dispensing heads along the indexing direction Y, according to various exemplary embodiments of the present invention.

Reference is now made to FIG. 6 which schematically illustrates the registration of the nozzle arrays of the various heads along the indexing direction Y, to according to various exemplary embodiments of the present invention. Shown in FIG. 6 are three nozzle arrays 22*a-c* each designated to dispense a different modeling material, and three nozzle arrays 42*a-c* designated to dispense support material. In the present example, each array includes 9 nozzles, uniformly distributed along the indexing direction Y. Other numbers of nozzles per array are not excluded from the scope of the present invention. Nozzle arrays 22*a-c* and 42*a-c* can correspond to four different dispensing heads, three modeling heads each having one of arrays 22*a-c*, and one support head having all three arrays 42*a-c*. But this need not necessarily be the case. For example, nozzle arrays 22*a-c* and 42*a-c* can correspond to six different dispensing heads (three modeling heads and three support heads), two different dispensing heads (one modeling head and one support head), or any other combination.

According to a preferred embodiment of the present invention, the nozzle arrays are aligned along the scanning direction X in a manner such that a plurality of rows of modeling material are formed on the working surface in a substantially uniform distribution along the indexing direction Y. In other words, when all arrays operate during a single scan, there is a generally similar distance, d, between every two successive rows. In various exemplary embodiments of the invention, the nozzle arrays of support material (arrays 42*a-c* in the representative example of FIG. 6) are disposed along the indexing direction Y such that nozzles of each nozzle array of support material are aligned along the scanning direction X with nozzles of one nozzle array of modeling material. In the present example, the nozzles of array 42*a* are preferably aligned with the nozzles of array 22*a*, the nozzles of array 42*b* are preferably aligned with the nozzles of array 22*b* and the nozzles of array 42*c* are preferably aligned with the nozzles of array 22*c*.

For a plurality of head arrays, the arrays are preferably configured in sequential manner with respect to the scanning direction X (one behind the other) at locations denoted by integer numerals from 1 to N, where N is the number of arrays (three in the present example). The arrays are registered in an interlaced fashion in the indexing direction. Hence, when there are M nozzles (nine in the present example) in each array, a single scan in which all heads operate results in the formation of N×M rows (27 rows in the present example). Formation of N×M rows using a single modeling array and a to single support array, on the other hand, requires a cycle of N scans (three in the present example), with intermediate shifts of the arrays along the indexing direction.

When N, the total number of arrays designated for dispensing modeling material, is an integer power of 2 (i.e., N=2, 4, 8, . . . ), such that, for any positive integer K≤N, lines of modeling material formed by nozzle array K are symmetrically disposed between lines of modeling material formed by all nozzle arrays of at locations 1 to K−1.

The term symmetrically disposed refers to an alignment along the indexing direction such that a newly formed row is formed at half the distance between the two previously formed mostly adjacent rows.

Figure 7:
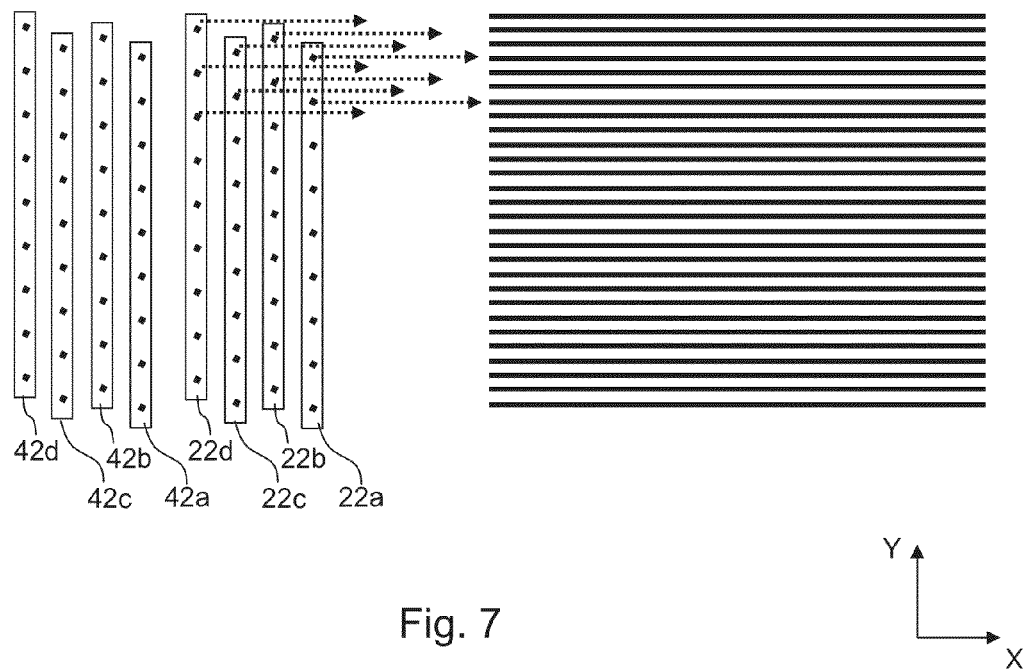

The situation is exemplified in FIG. 7 which schematically illustrates the registration of the nozzle arrays along the indexing direction, in a preferred embodiment in which N=4. Shown in FIG. 7 are four nozzle arrays 22*a-d* each designated to dispense a different modeling material, and four nozzle arrays 42*a-d* designated to dispense support material. Similarly to the example illustrated in FIG. 6, each array in the present example includes 9 nozzles, uniformly distributed along the indexing direction Y. Yet, as stated, other numbers of nozzles per array are not excluded from the scope of the present invention. Nozzle arrays 22*a-d* and 42*a-d* can correspond to any combination of modeling heads and support heads, as explained above in conjunction with FIG. 6. The nozzles of arrays 42*a-d* are respectively aligned along the indexing direction with the nozzles of arrays 22*a-d*.

In the exemplified configuration illustrated in FIG. 7, the four arrays 22*a*, 22*b*, 22*c* and 22*d* are arranged with respect to the scanning direction X in sequential order at locations 1, 2, 3 and 4 respectively. The alignment along the indexing direction is such that lines of modeling material formed by the nozzle array at location 2 (array 22*b* in the present example) are symmetrically disposed between lines of modeling material formed by the nozzle arrays at location 1 (array 22*a* in the present example). Lines of modeling material formed by the nozzle array at location 3 (array 22*c* in the present example) are symmetrically disposed between lines of modeling material formed by the nozzle arrays at locations 1 and 2 (arrays 22*a* 22*b* in the present example); and lines of modeling material formed by the nozzle array at location 4 (array 22*d* in the present example) are also symmetrically disposed between lines of modeling material formed by all nozzle to arrays of at locations 1 and 2 (arrays 22*a* and 22*b* in the present example).

The advantage of using such symmetry is that it prevents or reduces 'sticking' of adjacent lines to each other, and formation of asymmetrical gaps between adjacent lines. If a new line of modeling material is deposited between two formerly deposited lines, but closer to one than to the other, it will stick to or merge with the closer line and not with the line on its other side causing uneven layer thickness and formation of asymmetrical grooves between adjacent lines.

In various exemplary embodiments of the invention each layer of the object is formed at a predetermined and optionally different thickness, such that post-formation shrinkage is compensated for. This can be done using any procedure known in the art, such as, for example, the procedure disclosed in International Application No. PCT/IL2007/000429, the contents of which are hereby incorporated by reference. Generally, the required scale correction in Z direction after the fabrication finishes, as well as similar scale correction in the scanning X and indexing Y directions, depend on the formation duration of the layers. Although the heat generated and absorbed at each point of the layer does not depend on the formation duration, the cooling amount of the layer is proportional to the formation duration. Therefore the larger the formation duration, the cooler the layer is. Hence, objects of large layer formation time are cooler than objects of small layer formation time after the printing finishes, and therefore the former contract less than the latter after cooling to room temperature. The contraction factor may differ for X, Y and/or Z directions. In particular global contraction in Z is preferably smaller than in X-Y. This is because part of the contraction in Z (from the very first high temperature of a newly built layer to the steady state temperature of the object during building) is constantly compensated by the leveling apparatus and constant Z step during building. The contraction in the X-Y direction, on the other hand, takes place consistently from the initial temperature of a newly built layer until the object cools to room temperature.

In various exemplary embodiments of the invention the rescaling factors also depend on the type or types of modeling material used to fabricate the layer. This is because different materials may have different contraction characteristic after being cured and cooled. Thus, regions or objects having different modeling materials are preferably resealed according to a different rescaling factor. Alternatively, objects that to are formed of different modeling materials in different distinct regions (cf. FIG. 2b) the rescaling factor can be according to the hardest material in the fabricated object. For layers or objects formed from mixture of modeling materials, the scale factor is preferably a weighted average of the constituent modeling materials forming the mixture.

The present embodiments successfully provide a technique for forming internal or external structures of different materials. Such formation is particularly useful to improve the mechanical properties of the object being fabricated. For example, an object generally made of one or more rigid material, can include one or more layers or regions such as a skin layer made of less rigid materials so as to impart the object with additional surface flexibility thus making it more compliant and reducing its tendency to break under load. Conversely, an object generally made of one or more compliant materials can include one or more layers or regions such as a skin layer made of rigid materials so as to enhance its rigidity. One or more of the layers or regions can be applied by the system of the present embodiments. Regions or layers of different materials can be continuous, e.g., surrounding the core of the object, or discontinuous, e.g., in the form of islands of one material distributed in a bulk of another material.

Figure 8:
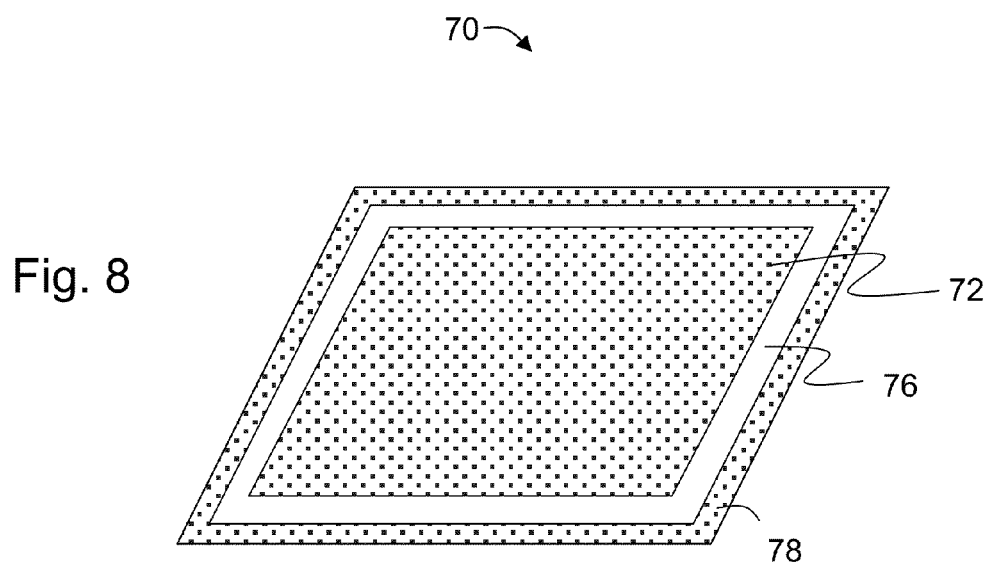
FIG. 8 is a schematic illustration of a cross section of an object having a buffer layer near the outer surfaces of the object, according to various exemplary embodiments of the present invention.

Reference is now made to FIG. 8, which is a schematic illustration of a cross sectional view of an object 70 having a continuous buffer layer 76 located near the object's surface. The interior 72 of object 70 is made of a generally hard modeling material which is being surrounded by buffer layer 76 of an elastic material. Elastic layer 76 is surrounded by an additional continuous layer 78 of a hard modeling material, which, in the representative illustration of FIG. 8 is the outer layer of object 70. Each of layers 76 and 78 is preferably thinner than interior 72, but can be made of one or more sub-layers of modeling material. A typical thickness of layers 76 and 78 is about 100 µm. It is to be understood that object 70 can also comprise other internal or external structures which may be continuous or discontinuous. Two adjacent structures can be made of different materials.

The present embodiments also contemplate coating an object by one or more layers of materials wherein two or more of the layers are made of different materials.

Skin regions or layers, according to some embodiments of the present invention can have various thicknesses. Representative examples, include, without limitation, from about 50 microns to about 1 millimeters, or from about 50 microns to about 500 microns.

The use of two or more modeling materials during the fabrication of the object can also be exploited for manufacturing objects having a predetermined pattern, such as a drawing or an image formed on their surface.

Figure 9:
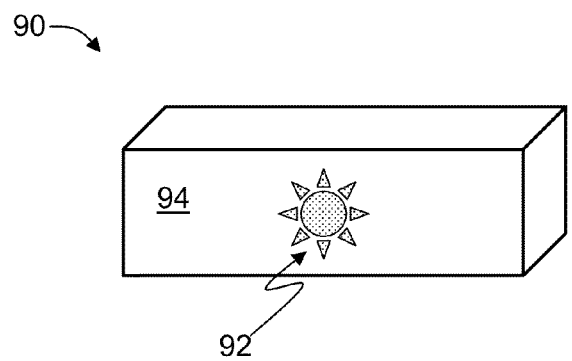
FIG. 9 is a schematic illustration of a three-dimensional object fabricated by SFF, having a pattern formed on its surface.

FIG. 9 is a schematic illustration of a three-dimensional object 90 fabricated by solid freeform fabrication and having a pattern 92 formed on the surface 94 of object 90. Pattern 92 can be a black and white pattern, a grayscale pattern or a colored pattern, as desired. Any type of pattern can be formed. Representative examples include, without limitation, a drawing, an image, a symbol, a plurality of symbols, a text, Braille alphabet, a barcode or any combination thereof.

Pattern 92 can be formed on the surface of the object in more than one way. In one embodiment, one or more layers of modeling material are dispensed according to the shape of the pattern on the surface of the object to form a patterned relief. The modeling material is preferably selected such that the pattern is distinguishable, preferably visible, on the surface of the object. For example, the surface can be made of a modeling material of one color and the pattern can be made of a modeling material of another color. Alternatively, both the surface and the pattern can be made of the same color, but with different level of gray component. Thus, the present embodiment is suitable for color, grayscale or black and white pattern. A typical thickness of pattern 92 above surface 94 is about 0.3 mm, but other thicknesses are not excluded from the scope of the present invention.

In another embodiment, the pattern is embedded in the surface of the object such that pattern 92 is flush with surface 94. This can be achieved by selectively dispensing more than one type of modeling material during the fabrication of surface 94 such that one type of modeling material is dispensed according to pattern 92 while another type is dispensed to form different sections of surface 94. This embodiment is also suitable for color, grayscale or black and white pattern.

In an additional embodiment, also suitable for color, grayscale or black and white, pattern 92 forms an intaglio in surface 94. This can be achieved, for example, by fabricating the surface of the object in a manner such that locations on the surface to corresponding to pattern 92 are excluded during the fabrication process. The pattern can be visually enhanced by ensuring the layers beneath the outermost surface of the object are of a different color or of the same color but with different gray component.

In any of the above embodiments, the pattern can be made of a modeling material having a different mechanical property, such as, but not limited to, different elasticity or flexibility. Alternatively, the pattern can be made of a modeling material having the same mechanical property, but different optical property. For example, if it is desired to fabricate an object having a certain degree of elasticity, the pattern can be fabricated using a mix of materials which ensure that the elasticity of the object is intact in the patterned as well as the non-patterned regions of the object.

In any of the above embodiments, the color, gray component or saturation of the pattern can be controlled by selecting the modeling material according to the desired color or gray component, or by varying the thickness of the patterned layer. For example, the material in a layer under pattern 92 may be red as opposed to the bulk material which can be translucent or white. When the thickness of the layer varies according to the pattern, the resulted pattern comprises different levels of redness saturation.

The use of a plurality of different modeling material also facilitates fabrication of thick patterns such as a drawing or a picture as further detailed hereinabove. This can be done by repeatedly printing a two dimensional pattern (e.g., represented by a bitmap) in a plurality of successive layers until the desisted thickness is achieved.

Figure 10A:
FIGS. 10a-b are schematic illustrations of cross sections of a deep pattern.

A representative example of a deep pattern is illustrated in FIG. 10a, which illustrates an X-Z cross section of the object. The fabrication process is preferably as follows: a first layer of building material of uniform thickness is formed on a work surface according to a given multi material pattern. Subsequent layers, successively elevated in the Z direction, are built one on another, each depicting the same pattern as depicted in the first layer. The material combinations in the layer can be, for example, an appropriate mix of basic color materials (that are supplied to the machine heads). In this way the same color pattern appears at both the bottom of the object and at its top surface.

Figure 10B:
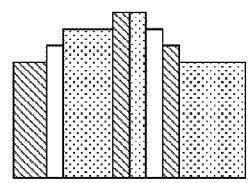

In another embodiment, illustrated in FIG. 10b, which illustrates an X-Z cross section of the object, image information of the deep pattern can be combined with image to information of another three-dimensional object in a manner such that only common parts of the deep pattern and three-dimensional object are fabricated by the solid freeform fabrication. In other words, when the deep pattern is fabricated, its surface is trimmed according to the outer surface of the three-dimensional object.

According to an embodiment of the present invention, there is provided a method suitable for solid freeform fabrication. The method uses a plurality of dispensing nozzles, such that at least two nozzles dispense modeling materials which differ from each other. The method fabricates and object which comprises material with a predetermined value of an attribute (such as, but not limited to, hardness, solidity, elasticity, flexibility, color, translucency, electrical and/or magnetic behavior). In some embodiments of the present invention the method fabricates an object having a predetermined attribute other than color (e.g., hardness elasticity, flexibility).

In various exemplary embodiments of the invention the method comprises the following method steps in which in a first step a required proportion of the different modeling materials is calculated using a lookup table, a mathematical expression and the like; and in a second step the different modeling materials are dispensed according to the calculated proportion of materials. In some embodiments of the present invention the method uses the proportion for fabricating an object having a predetermined attribute other than color (e.g., hardness elasticity, flexibility).

In exemplary embodiments of the invention the fabricated object comprises a spatial zone in which at least one attribute of the material continuously changes from one point to another.

According to an additional embodiment of the present invention, there is provided a method in which at least two separate objects are fabricated by solid freeform fabrication on a building tray. The separate objects are fabricated from different modeling material combinations. According to the present embodiment of the invention, the dimensions of the objects are rescaled along a direction so as to compensate for post-formation shrinkage of the objects along the direction. The scale factors of the different can be different. Regions having different modeling material combinations that touch each other can be rescaled according to a common resealing factor.

Techniques of various exemplary embodiments of the invention can be realized to using a printing apparatus having a tray on which objects are created, at least two printheads and at least two building material containers, where each printhead is associated with a material container, a gantry with at least one socket for the printheads, means for providing relative movement between said gantry and said tray, and control means for dispensing building material from at least one printhead that is installed in the socket(s), in accordance with an input pixel map. Replacement of building material which relates to a socket can be accomplished by replacing the printhead in the socket and its associated material container.

Techniques of various exemplary embodiments of the invention can also be realized using a printing apparatus having a tray, gantry, means for providing relative movement and control means as described above, and additionally means for feeding material from a container to a printhead upon command. In various exemplary embodiments of the invention there is no liquid pipe connection between the container and head.

It is expected that during the life of this patent many relevant types of solid freeform fabrication apparatus will be developed and the scope of the term solid freeform fabrication apparatus is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Example 1

System Operation Protocols

In the present Example, an object is defined as a volume in space (usually specified in an X, Y, Z coordinate system) which is confined by one or more close surfaces which do not intersect with each other (see, e.g., FIG. 2a). A region in the object is a sub-volume of the object which is confined in one or more close surfaces which do not intersect with each other (see, e.g., FIG. 2b).

A communication file is a file in which the specification of an object is saved by the CAD Software and from which the solid freeform fabrication apparatus retrieves the full information on the object. The structure and format of the communication file is known to both the CAD and the software controlling the solid freeform fabrication apparatus.

An STL file is an example of communication files that both CAD and the software controlling the solid freeform fabrication apparatus recognize. In an STL file, the object is specified by a series of triangles that optimally fit all the object surfaces. The triangles touch each other along their chords or at their vertices and never a vertex of a triangle lies on a chord of a neighbor triangle. Since an object is always confined in one or more close surfaces which do not intersect with each other, the group of triangles always consists of close sets of triangles which refer to close surfaces.

The user retrieves objects from communication files by operating the solid freeform fabrication software. The user places a plurality of different objects on a virtual printing tray, and specifies printing parameters. For example, the user can assign different materials to different objects or objects' regions etc.

When an object is to be composed of regions of different materials, the regions are specified and identified in the CAD design. There is an option to attribute a property (e.g., color, rigidness) or a name of material to a region. Upon writing the information to a communication file, the region information is also written, with or without its attributes.

The region information can be written to the communication file in more than one way.

In one embodiment, the group of elements which describe the object is composed of subgroups, each describing a region in the object.

In another embodiment, a group of communication files which describes the object is prepared. Each communication file describes a region in the object, and all to files refer to the same X-Y-Z coordinate system.

In an additional embodiment, several sets of triangles are specified. In an STL format, for example, the borderline between two regions is regarded as both part of a surface of the first region and part of a surface of the second region. Consequently two sets of triangles can be specified on the borderline, one belongs to a close set of triangles which describes a surface in the first region and another that describes a surface in the second region. When the object is retrieved in the controller or user station, the closed surface of both the object and the regions are retrieved. The operator can specify region in accordance with the retrieved surfaces and by using additional instructions by the designer.

The operator of the solid freeform fabrication apparatus of the present embodiments can specify additional regions in the object, and ascribe different materials to the additional regions. For example, the operator can create a soft layer at the outer surface of a hard object.

The operator of the solid freeform fabrication apparatus of the present embodiments can specify additional regions in the object, and ascribe different materials to the additional regions. For example, the operator can creating a soft layer at the outer surface of a hard object.

Each material has its own contraction characteristic after being cured and cooled. Therefore each material needs a specific contraction correction factor (scale) to compensate for said contraction. According to a preferred embodiment of the present invention the software assigns the respective scale factor to each object, depending on the material that comprises the object. For materials that are comprised of a mix of materials (uniform as well as composite) the scale factor is preferably a weighted average of the constituents. For objects that are comprised of a plurality of regions, each made of different material, the scale is preferably determined according to the material which is harder.

Example 2

Exemplified Workflow

The present Example describes a workflow for building one or more three-dimensional objects from several materials, according to some embodiments of the to present invention. The workflow includes several stages which can be executed by the user or automatically.

The solid freeform fabrication apparatus is fed by different input materials, each being fed into a different container. In the following, N represents the number of different input materials. It is noted that the number of occupied containers in the solid freeform fabrication apparatus can be more than N, in which case two or more containers include the same material.

A computer, which is capable of communicating with the solid freeform fabrication apparatus, receives a list of groups of input materials which are allowed to be fed together into the apparatus. Each group can comprise from 2 to N combinable input materials. Materials which are not allowed to combine are not included in the same group.

The computer can comprise a display device which displays the material characteristics (e.g., mechanical characteristics, thermo-mechanical characteristics, optical characteristics, etc.) of each of the N input materials and optionally each possible combination of materials. Thus, for example, when there are G groups of combinable input materials ($G \leq 2^N - N - 1$), the computer can display the characteristics of up to N+G different materials and material combinations.

Once the various characteristics are displayed, the user selects the desired groups of input materials for the fabrication of the object. Optionally, the user specifies overcoat of at least some of the shells or of the object as a whole. For each shell or overcoat, the user can assign a specific material combination, based on the various characteristics of the groups.

All data pertaining to the coordinates of each part of the object, together with materials or groups of materials associated with each part, are referred to as the virtual design of the object. The virtual design can be saved in a format readable by the solid freeform fabrication apparatus.

The above group selection procedure can be repeated one or more time so as to design a fabrication tray on which more than one object or more than one separate parts of the same object can be fabricated simultaneously, such that all parts or objects are fabricated using at least some of the N input materials.

The user can load the input materials into the solid freeform fabrication to apparatus.

Once the virtual design of each object or part is saved in the computer and all input materials are loaded, the user can start the fabrication process. The solid freeform fabrication reads the virtual design from the computer and selects the materials and dispensing locations on the tray based on the virtual design.

Example 3

Software Application for Combining 2 Materials in an Object

The background art fails to teach how different building materials can be used in order to build complex object assemblies and how a communication file representing a three dimensional object can be manipulated in order to build a three dimensional object comprising more than one material.

The following example describes a method suitable for designing and building an object from a composite material. The method enables the definition of composite material structures, without the need for standard CAD software in order to design the full three-dimensional structure, thus saving on the time that would be required for the design process as well as saving computer memory resources which would usually be required in order to design three-dimensional structures and for the analysis of such three-dimensional structure during the building process.

General

The method comprises Boolean comparison between bitmaps representing the desired composite material structure and bitmaps representing the three-dimensional object.

Bitmaps representing a cross-section of the desired composite material can be designed, for example, width parameters and space parameters as summarized in the Table 3:

TABLE 3

|  | X | Y | Z |
|---|---|---|---|
| Width |  |  |  |
| Space |  |  |  |

Table 3 can be used to define an elementary three-dimensional body whose dimensions include a width parameter along each of the three X-Y-Z Cartesian coordinates. For example, for a (0.1 mm)×(0.1 mm)×(0.1 mm) cube, the values in the first row of Table 3 are: width (X)=width (Y)=width (Z)=0.1 mm The layout defined by Table 3 can be repeated a plurality of times within the to three-dimensional volume defined by a relevant communication file, e.g., STL.

The second row of Table 3 can be used to define the distance between adjacent elementary three-dimensional bodies. This is conveniently done using a space parameter along each of the three X-Y-Z Cartesian coordinates. For example, when width (X)=width (Y)=width (Z)=0.1 mm, and space (X)=space (Y)=space (z)=0.2 mm, Table 3 defines a composite material wherein 0.1×0.1×0.1 cubes of a material are uniformly distributed in a second material, and wherein the distance between the cubes along each of the X, Y and Z axes equals 0.2 mm In some embodiments of the present invention one or more additional parameters is added to Table 3 so as to increase the possibilities available in the composite material definition process. These additional parameters can include "thickness" and "offset". For example, when the thickness parameter is defined as thickness=1 mm and the XY "offset" as offset=0.05 mm, the bitmap defined by the Table 3 is first built up to a 1 mm height (thickness). Then, the same bitmap is built offset a distance of 0.05 mm from the first bitmap's axes, up to a 1 mm further height, at which point the bitmap returns to the former position and so on, alternating between the two positions offset from one another until the entire three-dimensional structure has been built.

The present embodiments contemplate the use of any number of bitmaps in order to define the desired composite material structure and any combination of bitmap definitions.

The Boolean comparison between the composite material defined by each bitmap and the bitmaps defining different three-dimensional object cross-sections enables the building of a three-dimensional object using a composite material. For example, comparing the bitmap defined Table 4 below and the bitmaps which define the cross sections of a (50 mm)×(50 mm)×(50 mm) cube results in a cube sequentially made of a composite material as schematically shown in FIG. 11.

TABLE 4

|  | X | Y | Z |
|---|---|---|---|
| Width | 0.2 | 0.1 | 0.1 |
| Space | 0.2 | 0.5 | 0 |

The following procedure can be used in accordance with some embodiments of the present invention for designing composite materials using two tables, referred to hereinunder as Tables A and B. The procedure requires definition of the materials to be used in order to build the composite material as well as their spatial deposition.

For each table, the modeling material is defined and the appropriate values for the parameters (e.g., width and space) are selected. These definitions are transformed into bitmaps, where, for example, each table can define up to 2 different bitmaps as explained above. To help the design, the values introduced in Tables A and B can be depicted graphically in the form of bitmaps, one bitmap for each table. In some embodiments of the present invention a three-dimensional representation of the model structure defined by Tables A and B is also presented.

Before building each layer of the object, a Boolean comparison is made between the bitmaps defined by the two tables and each three-dimensional object cross-section. Then, the materials selected in the tables are deposited in layers according to the bitmaps. For example, in one embodiment, firstly a deposition is carried out according to Table A up to the height (Z) defined in Table A, and secondly a deposition is carried out according to Table B up to the height defined in Table B. Building is continued by alternating between the bitmaps until the object is completed.

Following are examples of 3 basic composite material structures designed according to the method delineated above. In examples (i)-(iii) below, M1 represents a first type of modeling material, M2 represents a second type of modeling material and S represents a support material.

(i) Dispersed Phase Material Structure

In this structure, one modeling material is dispersed within another. Representative examples for the two tables are provided below, where the table corresponding to material M1 is denoted Table 5-A and the table corresponding to material M2 is denoted Table 5-B:

TABLE 5-B

|  | X | Y | Z |
|---|---|---|---|
| Width | 0 | 0 | 0 |
| Space | 1 | 1 | 2 |

TABLE 5-A

|  | X | Y | Z |
|---|---|---|---|
| Width | 1 | 1 | 1 |
| Space | 2 | 2 | 2 |

The values introduced in Tables 5-A and 5-B can be graphically presented as bitmap, as illustrated in FIGS. 12a and 12b, respectively.

(ii) Laminate (XY) Model Structure

Representative examples for the two tables in this structure are provided below, where the table corresponding to material M1 is denoted Table 6-A and the table corresponding to material M2 is denoted Table 6-B:

TABLE 6-B

|  | X | Y | Z |
|---|---|---|---|
| Width | 1 | 1 | 1 |
| Space | 0 | 0 | 0 |

TABLE 6-A

|  | X | Y | Z |
|---|---|---|---|
| Width | 1 | 1 | 1 |
| Space | 0 | 0 | 0 |

The values introduced in Tables 6-A and 6-B can be graphically presented as bitmap, as schematically illustrated in FIGS. 13a-b, respectively.

Interpenetrating Network (IPN) Model Structure

In this type of structure, two continuous phases are built. The continuous phases may be of 2 different modeling materials or one modeling material and one support material.

Representative examples for the two tables in this structure are provided below, where the table corresponding to material M1 is denoted Table 7-A and the table corresponding to material M2 is denoted Table 7-B:

TABLE 7-A

|  | X | Y | Z |
|---|---|---|---|
| Width | 1 | 1 | 0.5 |
| Space | 0.5 | 0.5 | 0 |

TABLE 7-B

|  | X | Y | Z |
|---|---|---|---|
| Width | 0.5 | 0.5 | 1 |
| Space | 1 | 1 | 0 |
| Offset | −0.5 | −0.5 | |

The values introduced in Tables 7-A and 7-B can be graphically presented as bitmap, as schematically illustrated in FIGS. 14a-b, respectively. Note the effect of the offset parameter on the coordinate system shown in FIG. 14b.

Figure 15:
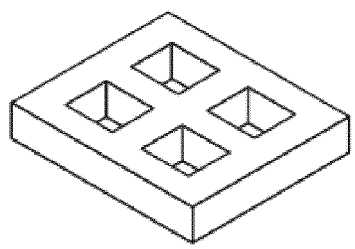
Figure 16:
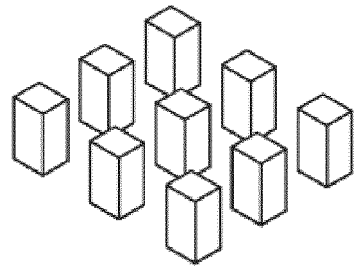
FIG. 16 is a schematic illustration of a construction according to the bitmap shown in FIG. 14b.
Figure 17:
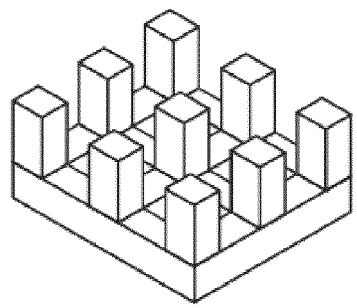
FIG. 17 is a schematic illustration of a construction according to the bitmap shown in FIGS. 14a-b.

FIG. 15 schematically illustrate a three-dimensional representation of the bitmap according to Table 7-A. In FIG. 15, elementary bodies made of material M1 are shown as transparent, and elementary bodies made of material M1 are shown as shown in gray color. As shown elementary bodies made of material M1 are surrounded by elementary bodies made of material M2 to a height of 0.5 mm FIG. 16 schematically illustrates a three-dimensional representation of the bitmap according to Table 7-B, as built over the bitmap shown in FIG. 15. As shown, elementary bodies made of material M2 are built surrounded by elementary bodies made of material M1 to a height of 1 mm FIG. 17 schematically illustrate a three-dimensional representation of an object constructed according to tables, similar to Tables 7-A and 7-B but with different width, space and offset parameters.

Figure 18:
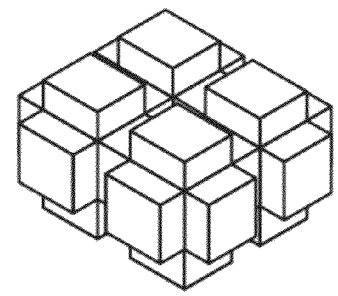
FIG. 18 is a schematic illustration of construction of a first material in an IPN model structure.
Figure 19:
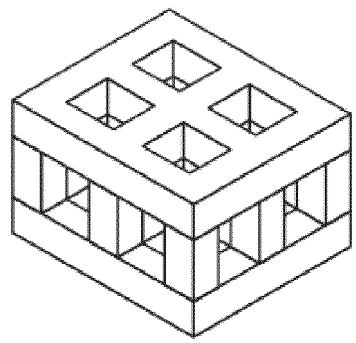
FIG. 19 is a schematic illustration of construction of a second material in an IPN model structure.
Figure 20:
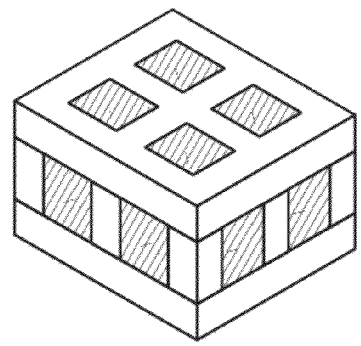
FIG. 20 is a schematic illustration of construction of a first material and a second material in an IPN model structure.

The deposition of material M1 according to Table 7-A results in the construction illustrated in FIG. 18, and the deposition of material M2 according to Table 7-B results in the construction shown in FIG. 19. The combined object which includes both material (M1-black and M2-gray) is illustrated in FIG. 20.

Example 4

Exemplary Three-Dimensional Printing Apparatus

The present inventors found that three-dimensional printing in accordance with some embodiments of the present invention can be performed using a three-dimensional to printing apparatus having a printing assembly and a service assembly.

Figure 21A:
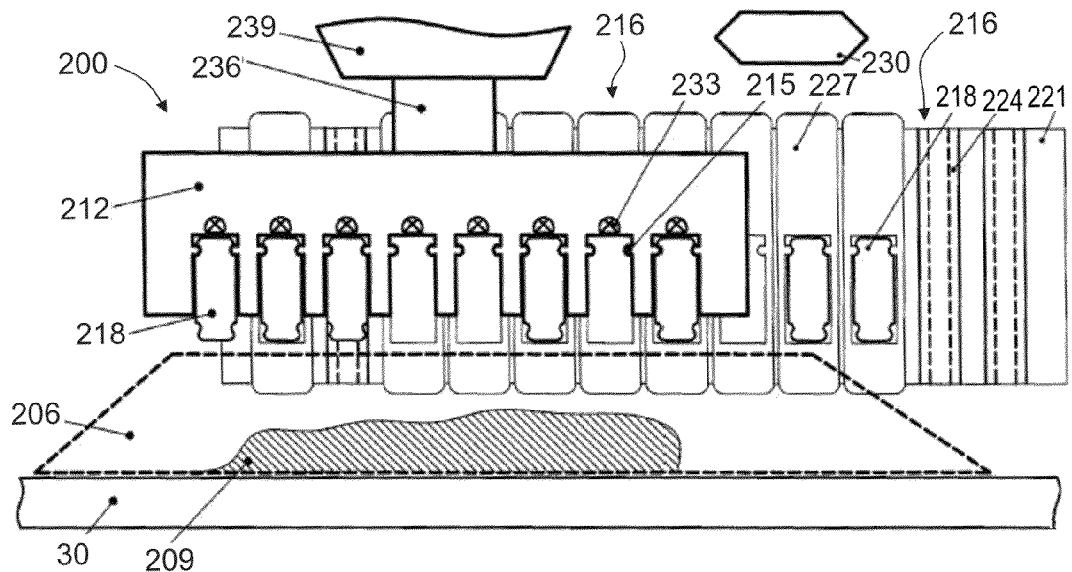
FIGS. 21a-b are schematic illustrations of a side view (FIG. 21a) and a top view (FIG. 21b) of a printing device, according to various exemplary embodiments of the present invention.
Figure 21B:
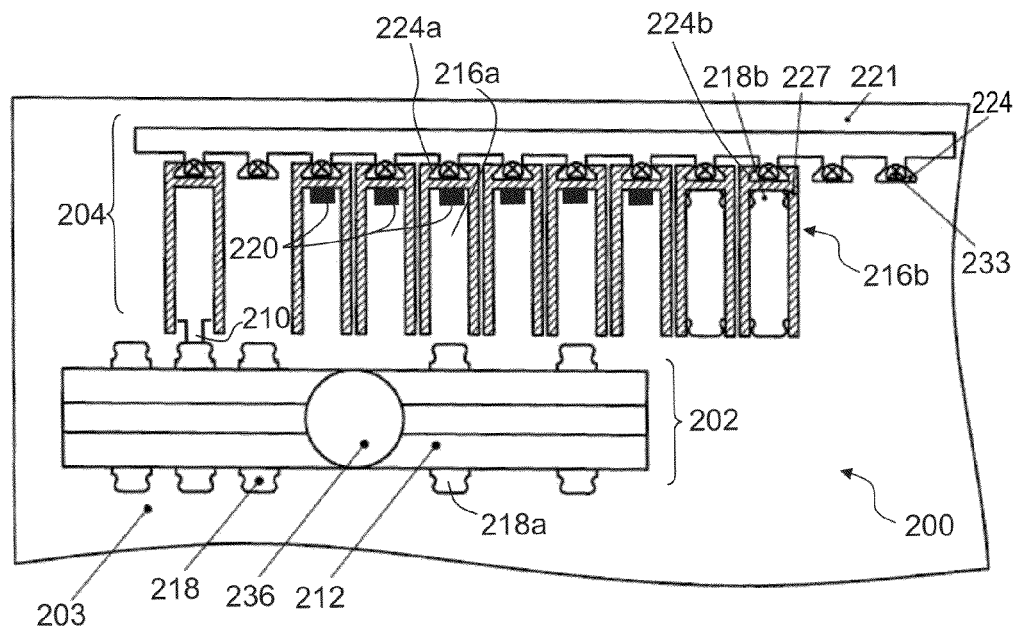
Figure 22:
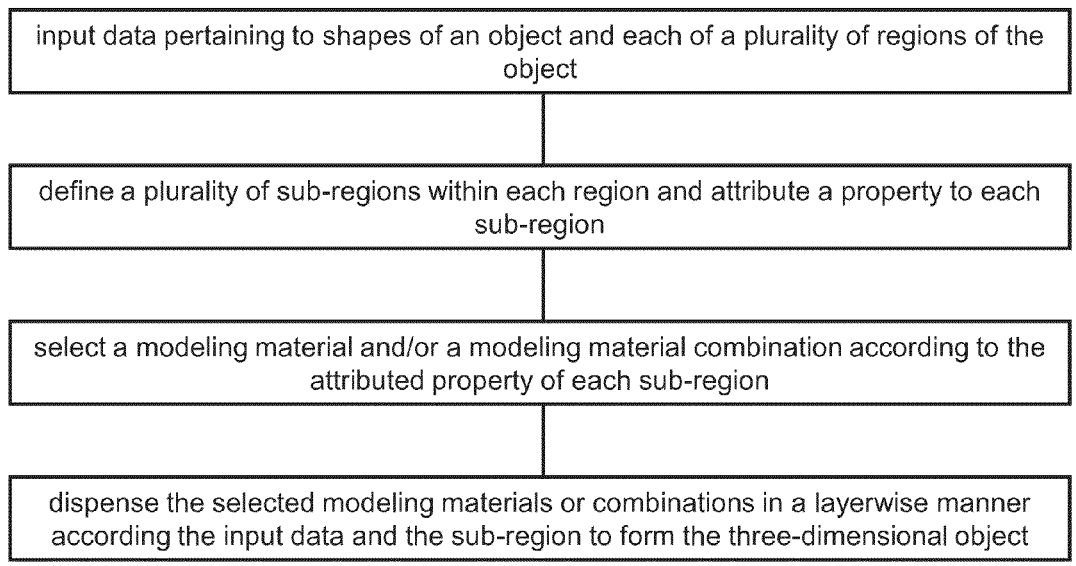
FIG. 22 is a flowchart describing a method of solid freeform fabrication of an object, according to embodiments of the present invention.

Reference is now made to FIGS. 21a-b, which are schematic illustrations of a side view (FIG. 21a) and a top view (FIG. 21b) of a combined printing device 200, according to various exemplary embodiments of the present invention. Combined printing device 200 comprises a printing assembly 202 having a plurality of printing units 218, and a service assembly 204 having a plurality of service stations 216. At least one of the two assemblies 202 and 204, preferably printing assembly 202 is movable, and in any event a relative motion can be established between printing assembly 202 and service assembly 204.

For example, printing assembly 202 can be movable and service assembly 204 can be made static, such that when printing assembly 202 moves a relative motion is established between the two assemblies.

In some embodiment in which printing assembly 202 is movable, there are no movable flexible tubes which are connected to printing assembly 202. In some embodiments in which service assembly 204 is movable, there are no movable flexible tubes which are connected to service assembly 204.

A printing unit 218 of assembly 202 can comprise at least one active printing element, such as, but not limited to, a printing head (which may include one or more nozzle array, as further detailed hereinabove) for dispensing building material (either modeling material or support material as further detailed hereinabove), a radiation source for curing or solidifying the modeling material, and the like. Assembly 202 can include a body 212 such as a cassette with a plurality of holders 215 on which the printing units are mounted. Yet, some holders may be vacant so as to make assembly 202 modular in the sense that printing units can be added or removed from the assembly if desired.

A service station 216 of assembly 204 can comprise service means 227 such as, but not limited to, means for refilling building material, means for cleaning an active printing element, a replacement active printing element and means for replacing an active printing element of printing assembly 202 and the like. Assembly 204 can include a body 221 such as a cassette with a plurality of holders 224 on which the service units are mounted. Some holders may be vacant so as to make assembly 204 modular in the sense that service units can be added or removed from the assembly if desired.

Printing assembly 202 is configured for docking near service assembly 204 such that service assembly 204 performs one or more service tasks, e.g., refilling of building material, or cleaning or replacing an active printing element, during the docking. One or more of these service tasks can be effected via a plurality of actuating units 220 which in various exemplary embodiments of the invention are mounted on at service assembly 204 and/or printing assembly 202. Actuating units 220 can be configured for disconnecting and/or connecting printing units from or to the service assembly 204.

Before providing a further detailed description of the printing device, as delineated hereinabove and in accordance with some embodiments of the present invention, attention will be given to the advantages offered thereby.

An advantage of the present embodiment over traditional three-dimensional apparatus in which flexible tubes are employed (see, e.g., U.S. Pat. No. 6,989,115 supra and International Patent Application, Publication No. WO04044816), is that the flexible tubes make the maintenance of the apparatus more complicated. For example, since flexible tubes accumulate used building material, it is complicated to remove the used material from the tubes before using another building material. Since the printing assembly of device 200 is not connected to movable flexible tubes, maintenance, such as replacement of building material becomes simpler.

Another advantage of the present embodiments is that a three-dimensional printing apparatus which includes combined printing device 200 is smaller and less expensive compared to conventional three-dimensional printing apparatus, since the movable flexible tubes make the apparatus bulky and expensive.

Another advantage of the present embodiments is that device 200 can facilitate automatic replacement of active printing elements, which is not achievable when the movable printing elements are connected to flexible tubes.

Another advantage of the present embodiments is that printing device 200 can facilitate modification of active printing elements without imposing a change on the design of the printing device. This is not practical in traditional apparatus because traditional apparatus are rigid in their design and generally do not allow any modification without substantially redesigning the printing device.

Combined printing device 200 can be incorporated in any a three-dimensional to printing apparatus. For example, when apparatus 14 described hereinabove is a printing apparatus, device 200 can be incorporated in apparatus 14. Generally, such printing apparatus may comprise building tray 30 with a working zone 206 for receiving building material 209 from printing assembly 202 and for carrying an object (not shown) formed by building material 209, and a control unit 230 which controls printing assembly 202 and service assembly 204.

Printing assembly 202 can be mounted on a holder 236 of a positioning mechanism 239, which can perform three-dimensional movements. Printing assembly 202 can thus scan tray 30 and dispense the building material to form the three-dimensional object, as further detailed hereinabove. The object can be formed from a single modeling material or a plurality of modeling materials as further detailed hereinabove in connection to the operation modes of apparatus 14. Combined printing device 200 can also be incorporated in a system which includes device 200, a printing apparatus (e.g., apparatus 14), and a building material supply apparatus (e.g., apparatus 50) which supplies a plurality of building materials to the printing apparatus, as further detailed hereinabove. For example, device 200 can be incorporated in system 10. In this embodiment, control unit 52 can be configured to also have the functionality of control unit 230.

Control unit 230 can receive printing commands from a data processor (not shown), for example, based on bitmaps describing the layers of the object, as further detailed hereinabove. Both before and during the printing process, control unit 230 may decide to dock printing assembly 202 near service assembly 204 to allow the various service tasks to be executed.

One such service task is the feeding of the printing heads with the appropriate building materials. In various exemplary embodiments of the invention a temporary fluid communication 210 is established between at least one printing unit 218 and at least one service station 224 during docking. Fluid communication 210 is "temporary" in the sense that the fluid communication exists while docking and ceases to exists when there is a relative motion between assemblies 202 and 204 or when assembly 202 does not dock near assembly 204. Once the temporary fluid communication is established, unit 230 can signal the respective service station to supply building material to the respective printing unit. The use of temporary fluid communication is advantageous to because there is no need for movable flexible tubes.

Another task is the cleaning of the printing units. This can also be performed via fluid communication 210. For example, unit 230 can signal the respective service station to apply rinsing liquid and/or suction for cleaning the respective printing unit.

An additional service task which can be executed while docking is the replacement of an active printing element. A technique for performing such replacement, according to some embodiments of the present invention is illustrated in FIG. 21*b*. Suppose that a particular printing unit, designated by reference sign 218*a*, is to be replaced, and that assembly 202 docks such that unit 218*a* is near (e.g., opposite to) a particular service station, designated by reference sign 216*a*. Suppose further that a replacement printing unit, designated by reference sign 218*b*, is mounted on another service station, designated by reference sign 216*b*, which is away from unit 218*a*. Firstly, unit 230 signals service station 216*a* to disconnect unit 218*a* from assembly 202. In response to the signal, actuator unit 220 of station 216*a* disconnects unit 218*a* and mounts it on station 216*a* (e.g., via a holder 224*a*). for example, using an installed in station 216*a*). As a result, the holder 215 (not shown) which held unit 218*a* on assembly 202 becomes vacant. Secondly, unit 230 signals assembly 202 to maneuver and dock such that that the vacant holder of assembly 202 is near service station 216*b* of assembly 204. Thirdly, unit 230 signals service station 216*b* to connect unit 218*b* to assembly 202. In response to the signal, actuator unit 220 of station 216*b* disconnects unit 218*b* from assembly 204 and mounts it on the vacant holder of assembly 202.

Any of the above tasks can be executed automatically by control unit 230 without additional user input. In these embodiments, device 200 preferably comprises an arrangement of sensors for sensing the presence of the service means and printing units on assemblies 204 and 202, respectively. Preferably, a sensor 233 is positioned at each location (e.g., near or on the respective holder) of the assemblies. Sensors which are located on assembly 202 can also be configured for sensing the amount of building material in the respective printing head. Sensors 233 transmit sensor data to control unit 230. Based on the sensor data, unit 230 decides whether or not a service task is required.

Following is a description of an exemplary three-dimensional printing of an object which can be executed according to various exemplary embodiments of the to present invention.

Before the printing process is initiated, assemblies 202 and 204 can be brought to a position where holders 215 and 224 can be manually accessed. The operator mounts the various printing units and service means onto at least some of holders 215 and 224. The operator may also mount replacement active printing elements holders 224. One or more of the holders can remain vacant.

Control unit 230 receives the printing command and the corresponding data for printing the three-dimensional object.

Via sensors 233, control unit 230 checks the presence of required printing units 218 on holders 215 and service means 227 on holders 224. Unit 230 can also check the presence and amount of building material in the respective printing units.

If control unit 230 determines that not all the printing units and service means are in place control unit 230 signals the operator to mount the missing component(s) on the respective assembly.

If control unit 230 determines that all the printing units and service means are in place and that there is a sufficient amount of building material, control unit 230 begins the building of the three-dimensional object by scanning tray 30 and dispensing building material thereon as further detailed hereinabove.

When control unit 230 determines that a service task is to be executed (e.g., when one or more printing heads are to be cleaned, replaced or refilled with building material), unit 230 signals assembly 202 to temporarily cease the printing process dock near assembly 204. Docking may also be performed irrespectively of input from sensors 233, for example, at predetermined times or following a predetermined number of scans over tray 30.

When control unit 230 identifies an acute operational deficiency which cannot be remedied by the service stations (for example, malfunction of a printing unit and lack of compatible replacement unit on the service assembly), unit 230 preferably cease the printing process and issues a report regarding the acute operational deficiency.

According to some embodiments of the present invention there is provided a method of registering data for solid freeform fabrication of an object. The method comprises selecting one or more material combinations, and determining, for each to material combination the relative amounts of different materials in the combination. In some embodiments of the present invention the relative amounts can correspond to a property of the material combination.

In various exemplary embodiments of the invention a three-dimensional spatial distribution is associated with each material combination. The special distribution of each material within the combination of materials represents the composite material phase structure.

The relative amounts and/or spatial distribution can be determined by performing experimentations with the different materials and/or by estimating the relative amounts based on properties of each of different materials.

The material combinations and the relative amounts can be recorded in a computer readable medium. In embodiments in which the relative amounts and/or spatial distribution correspond to a property of the material combination, the property of the combination can also be recorded. Thus, a computer readable medium can comprise a list of combinations, each being defined by relative amounts and optionally spatial distributions of the relative amounts, where each member of the list is optionally associated with a property (such as, but not limited to, elasticity, hardness, solidity, elasticity, flexibility, color, translucency, electrical and/or magnetic behavior, etc.).

In some embodiments of the present invention there is provided a method of registering data for solid freeform fabrication of an object. The method comprises, selecting a plurality of material combinations, each material combination being defined by at least two different materials and at least two relative amounts respectively corresponding to the at least two different materials. For each material combination, a three-dimensional spatial distribution can be associated for the materials in the combination.

Optionally, one or more material property corresponding to the material combination is determined, by performing experimentations with the different materials and/or by estimating the relative amounts based on properties of each of different materials.

The material combinations, the relative amounts and spatial distributions can be recorded in a computer readable medium. In embodiments in which the relative amounts and spatial distribution correspond to a property of the material combination, to the property of the combination can also be recorded.

The computer readable medium can be used for fabricating an object. Thus, data pertaining to shapes of the object and each of the regions of the object is inputted to the solid freeform fabrication system. The data pertaining to shapes and properties of the object can be divided into a plurality of datasets each representing a different region of the object.

For each region, pre-registered data from the computer readable medium is inputted. The solid freeform fabrication system is then operated based on the inputted combinations.

In some embodiments of the present invention there is provided a method of solid freeform fabrication. The method comprises operating a solid freeform fabrication system for dispensing at least one modeling material, at least one support material and at least one additional material. In various exemplary embodiments of the invention the additional material is other than a modeling material and other than a support material. Such material is not formulated for use in three-dimensional building.

The additional material may have one or more of the following properties: (i) the additional material can be non-solidifiable or it may have a slow solidification rate (too slow for solid freeform fabrication), (ii) the additional material can be a material which is inhibited by the support material, (iii) the additional material can mix with the support material to produce a layer covering the object, (iv) the additional material can have poor mechanical properties without having a second material used to reinforce it, (v) the additional material can mix with the modeling material after the dispensing to form a solidifiable mixture.

Once the materials are dispensed, the modeling material is at least partially solidified such as to form a three-dimensional object. The partial solidification can be executed such that at least part of modeling material solidifies but additional material does not solidify.

In some embodiments of the present invention the additional material is at least partially interlaced with modeling material. In some embodiments of the present invention the additional material is removed after the fabrication so as to form a porous or hollow three-dimensional object.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of solid freeform fabrication of an object, the object having a plurality of regions, the method comprising:
   (a) inputting data pertaining to shapes of the object and each of the plurality of regions;
   (b) for at least one region:
      (i) defining a plurality of sub-regions within said region and attributing a property to each sub-region;
      (ii) for each sub-region, selecting a modeling material and/or a modeling material combination according to said attributed property of said sub-region, thereby selecting a plurality of modeling materials or modeling material combinations; and
      (iii) obtaining a resealing factor each modeling material and/or a modeling material combination; and
   (c) using a plurality of modeling material dispensing heads and at least one support material dispensing head each dispensing head comprising an array of nozzles for dispensing said modeling materials or modeling material combinations in a layerwise manner according to said input data and said attributed properties so as to form the three-dimensional object, and rescaling a dimension of the object along at least one direction so as to compensate for post-formation shrinkage of the object along said at least one direction, wherein said rescaling is selected from the group consisting of (i) rescaling according to a rescaling factor that is a weighted average of resealing factors associated with said modeling materials, (ii) rescaling according to different resealing factors for sub-regions having different modeling materials, (iii) resealing according to a common resealing factor for sub-regions having different modeling material combinations contacting each other; and (iv) resealing according to a resealing factor corresponding to the hardest of said modeling materials.

2. The method of claim 1, wherein the property is selected from the group consisting of hardness, solidity, elasticity, flexibility, color, translucency, electrical and/or magnetic behavior.

3. The method of claim 1, wherein said modeling material combination comprises at least two different modeling materials selected for occupying respective different locations with said sub-region.

4. The method of claim 1, wherein said modeling material combination is homogenous.

5. The method of claim 1, wherein said modeling material combination is non-homogenous.

6. The method of claim 1, wherein said plurality of sub-regions within said region comprise a bulk sub-region at least partially surrounded by a skin sub-region, wherein said bulk region and said skin region are formed of different modeling materials or modeling material combinations.

7. The method of claim 6, wherein said bulk region and said skin region have different elasticity.

8. The method of claim 6, wherein a modeling material or modeling material combination dispensed for said skin region is less rigid than modeling material or modeling material combination dispensed for said bulk region.

9. The method of claim 6, wherein a modeling material or modeling material combination dispensed for said bulk region is less rigid than modeling material or modeling material combination dispensed for said skin region.

10. The method of claim 6, wherein bulk region is fully surrounded by said skin region.

11. The method of claim 6, further comprising forming at least one buffer layer interposed between said bulk region and said skin region, using a modeling material or modeling material combination which is different to modeling materials or modeling material combinations forming said bulk region and said skin region.

12. The method of claim 11, wherein said at least one buffer layer has a higher elasticity than said bulk region and said skin region.

13. The method of claim 1, wherein a width of said skin region is from about 50 microns to about 1000 microns.

14. A system for solid freeform fabrication of an object having a plurality of regions, comprising:
a solid freeform fabrication apparatus having a plurality of modeling material dispensing heads and at least one support material dispensing head, each dispensing head comprising an array of nozzles;
a building material supply apparatus configured to supply a plurality of building materials to said fabrication apparatus; and
a control unit configured to receive data pertaining to shapes of the object and each of the plurality of regions, to define within at least one said region a plurality of sub-regions each being attributed at least one property, to select, for each sub-region, a modeling material and/or a modeling material combination according to an attributed property of said sub-region, to control said fabrication apparatus and said building material supply apparatus to dispense modeling materials or modeling material combinations in a layerwise manner according said received data and said attributed properties, and to rescale a dimension of the object along at least one direction so as to compensate for post-formation shrinkage of the object along said at least one direction, wherein said resealing is selected from the consisting of (i) rescaling according to a rescaling factor that is a weighted average of rescaling factors associated with said modeling materials, (ii) rescaling according to different rescaling factors for sub-regions having different modeling materials, (iii) rescaling according to a common rescaling factor for sub-regions having different modeling material combinations contacting each other; and (iv) rescaling according to a rescaling factor corresponding to the hardest of said modeling materials.

15. The system of claim 14, wherein the at least one attributed property is selected from the group consisting of hardness, solidity, elasticity, flexibility, color, translucency, electrical and/or magnetic behavior.

16. The system of claim 14, wherein said modeling material combination comprises at least two different modeling materials selected for occupying respective different locations with said sub-region.

17. The system of claim 14, wherein said modeling material combination is homogenous.

18. The system of claim 14, wherein said modeling material combination is non-homogenous.

19. The system of claim 14, wherein said plurality of sub-regions within said region comprise a bulk sub-region at least partially surrounded by a skin sub-region, wherein said bulk region and said skin region are formed of different modeling materials or modeling material combinations.

20. The system of claim 19, wherein said bulk region and said skin region have different elasticity.

21. The system of claim 19, wherein a modeling material or modeling material combination dispensed for said skin region is less rigid than modeling material or modeling material combination dispensed for said bulk region.

22. The system of claim 19, wherein a modeling material or modeling material combination dispensed for said bulk region is less rigid than modeling material or modeling material combination dispensed for said skin region.

23. The system of claim 19, wherein bulk region is fully surrounded by said skin region.

24. The system of claim 14, wherein said controller is configured to said fabrication apparatus and said building material supply apparatus to form at least one buffer layer interposed between said bulk region and said skin region, using a modeling material or modeling material combination which is different to a modeling material or modeling material combination forming said bulk region.

25. The system of claim 11, wherein said at least one buffer layer has a higher elasticity than said bulk region and said skin region.

26. The system of claim 14, wherein a width of said skin region is from about 50 microns to about 1000 microns.

27. A computer software product, comprising:
a non-transitory computer-readable medium in which program instructions are stored, which instructions, when read by a computer, cause the computer to receive data pertaining to shapes of an object and each of a plurality of regions thereof, to define within at least one of said regions a plurality of sub-regions each being attributed at least one property, to select, for each sub-region, a modeling material and/or a modeling material combination according to an attributed property of said sub-region, to rescale a dimension of the object along at least one direction so as to compensate for post-formation shrinkage of the object along said at least one direction, and to output said modeling material and/or a modeling material combination to a control unit of a solid freeform fabrication system, wherein said resealing is selected from the group consisting of (i) rescaling according to a resealing factor that is a weighted average of rescaling factors associated with said modeling materials, (ii) rescaling according to different resealing factors for sub-regions having different modeling materials, (iii) resealing according to a common resealing factor for sub-regions having different modeling material combinations contacting each other; and (iv) resealing according to a resealing factor corresponding to the hardest of said modeling materials.

* * * * *